(12) United States Patent
Lytle

(10) Patent No.: US 11,556,396 B2
(45) Date of Patent: Jan. 17, 2023

(54) STRUCTURE LINKED NATIVE QUERY DATABASE MANAGEMENT SYSTEM AND METHODS

(71) Applicant: Seth Lytle, Huron, OH (US)

(72) Inventor: Seth Lytle, Huron, OH (US)

(\*) Notice: Subject to any disclaimer, the term of this patent is extended or adjusted under 35 U.S.C. 154(b) by 1258 days.

(21) Appl. No.: 14/707,070

(22) Filed: May 8, 2015

(65) Prior Publication Data
US 2016/0328488 A1 Nov. 10, 2016

(51) Int. Cl.
*G06F 9/54* (2006.01)
*G06F 21/64* (2013.01)
*G06F 16/25* (2019.01)

(52) U.S. Cl.
CPC .............. *G06F 9/54* (2013.01); *G06F 16/252* (2019.01); *G06F 21/64* (2013.01)

(58) Field of Classification Search
CPC ................................ G06F 9/54; G06F 17/3056
USPC .......................................................... 707/737
See application file for complete search history.

(56) References Cited

U.S. PATENT DOCUMENTS

| | | | |
|---|---|---|---|
| 8,046,424 B2 * | 10/2011 | Novik | G06F 17/30575 707/620 |
| 2005/0256907 A1 * | 11/2005 | Novik | G06F 11/3419 719/315 |
| 2007/0219976 A1 * | 9/2007 | Muralidhar | G06F 11/2094 |
| 2007/0294663 A1 * | 12/2007 | McGuire | G06F 8/45 717/108 |
| 2013/0166855 A1 * | 6/2013 | Batwara | G06F 3/0608 711/154 |

\* cited by examiner

*Primary Examiner* — Hung T Vy

(57) ABSTRACT

The present invention relates to the field of database management systems, and in particular to a method and system for executing queries in a runtime. Embodiments of the invention provide a computer-implemented method, computer program product, and system for database management. The system exposes the underlying storage structures used to manage the data. The system also supports running a query native to a language runtime.

20 Claims, 5 Drawing Sheets

STRUCTURE LINKED NATIVE QUERY DATABASE MANAGEMENT SYSTEM AND METHODS

FIELD OF THE INVENTION

The present invention relates to the field of database management systems, and in particular to a method and system for executing queries in a runtime. Embodiments of the invention provide a computer-implemented method, computer program product, and system for database management. The system exposes the underlying storage structures used to manage the data. The system also supports running a query native to a language runtime.

BACKGROUND

A language runtime environment implements the core behavior of a computer language, connecting the compiled application with the system on which it runs. In the case of the C language, the runtime is a relatively thin layer, a set of instructions that are inserted into the executable itself. The Java Virtual Machine (JVM) is the runtime for Java programs, and the Common Language Runtime (CLR) is the runtime for C # and several other .NET languages.

A database or database management system (DBMS) is a tool that provides for the organization of, access to and control of a collection of data. An application program submits queries to a DBMS, the DBMS processes the query and returns the result to the application.

The DBMS stores the data in pages on a secondary storage device, usually a hard disk (HDD) or solid state (SSD) drive. All input/output operations (I/O) against secondary storage are done in page-sized units—ie, the entire page is read/written at once. The pages are organized into data structures that allow for fast storage, modification and retrieval. Different structures provide different performance characteristics and enable different interfaces.

Logically, many DBMSs represent the data that they are storing as tables of rows and columns and indexes to enable efficiently locating a row based on the value of a column. In general, all the columns of a row refer to properties of a common entity, but this is only a convention. If the fields of a row are stored together, the table is considered row oriented, and if the fields of a column are stored together, the table is considered column oriented or columnar. While this abstraction is a convenient metaphor for the programmer, the underlying physical data in the secondary storage is managed and organized by data structures in memory.

One common structure is a B+Tree, a multi-level tree in which each node is backed by one or more pages. Branch nodes point to the page of deeper nodes and values are stored in the leaf nodes. Keys are stored in sorted order, allowing finding a given key or range of keys while reading only a subset of the pages backing the tree. A B+Tree can store pointers to a row of a table, to allow retrieving a row without scanning the entire table, in which case it's called an index. A B+Tree can also be used to store variable sized records. A table might include a pointer into a B+Tree, eg using an integer as the key, to refer to a variable sized record. Some DBMSs store all row data in a B+Tree value indexed by the primary key.

Another data structure is an array, in which each row is a fixed size. A row can represent a simple value (e.g., an integer, a tuple of simple values) or a more complex value (e.g., an object representing a sales order that has been serialized). The array implements a mapping from row ID to a location in secondary storage where the row is stored.

Other structures that are used include hash tables, serialized objects, primitive values, and composite structures that are composed of other structures. In many cases, the DBMS records the list of all tables and indexes using these same structures. In addition to providing an abstract means of organizing the secondary storage pages, these structures correspond to in-memory objects in the language or runtime that the DBMS is implemented in.

Application programs are typically written in a high level language (e.g., Java or C#) and submit queries to the DBMS. Many databases use a declarative query language, Structured Query Language (SQL), to allow the application to describe the data that it wishes to modify or retrieve. The DBMS then converts the declarative query into an internal representation that it can evaluate (i.e., a query plan) and evaluates that query plan. The selected data is then aggregated and returned to the application.

This architecture introduces a number of impedance mismatches between the application and the DBMS. The application and business logic is written in a different language than the queries, so logic that is needed in both the application and the database needs to be duplicated. The objects returned by the query are database objects, which are often inconvenient to use in the application and it's runtime. Sending data to the DBMS from the application is similarly inconvenient. In many cases, the query language is text based, meaning that query code is not distinct from query data, leading to bugs and security problems including SQL Injection attacks. Finally, the declarative query language may make it difficult to express complex relationships between data, eg an algorithm that requires looping thru a set of data would be difficult to express. A number of techniques have been introduced to deal with these and other issues.

Prepared Statements, Stored Procedures (SP) and User Defined Functions (UDF) are tools some DBMSs make available to an application that can be referenced in a query. Prepared Statements are queries that are pre-parsed and compiled, allowing substitution at runtime. SPs and UDFs may be written in imperative languages and are callable from queries. Libraries and frameworks are available, eg Hibernate, that provide Object Relational Mapping (ORM), automatically converting the fields of a database row into a runtime object, eg an instance of a Java class.

Some object-oriented database management systems (OODBMS), represent information as objects and handle queries native to a runtime. For example, Db4o supports storing objects and queries native to the JRE and CLR. While these tools simplify the alignment of the database object and runtime object spaces, they hide the underlying storage model from the application programmer resulting in inefficient processing. For example, they might create full objects to test a query that could be expressed with a single column of data without the developer being aware. These tools alleviate some of the impedance mismatch, but introduce additional elements in between the application and the actual stored data for the programmer to manage and understand. What is needed is a system that exposes more of the underlying management structures to the application programmer.

Therefore, there is need in the art for systems and methods for providing direct access to data in a database management system (DBMS) and exposes more of the underlying management structures to the application programmer. These and other features and advantages of the present invention will be explained and will become obvious to one skilled in the art through the summary of the invention that follows.

SUMMARY OF THE INVENTION

Accordingly, it is an aspect of the present invention to provide systems and methods for providing direct access to data in a database management system (DBMS) and exposes more of the underlying management structures to the application programmer.

According to an embodiment of the present invention, a system for providing direct access to data in a database management system (DBMS) comprises: a database comprising a collection of columns, tables and indexes, each realized as one or more data management structures comprising an application programming interface (API) and a number of locations in persistent storage; a client configured to submit a query object to the DBMS, the query object comprising data and one or more invokable subroutines, wherein each of the invokable subroutines are configured to access one or more of the data management structures using the API, wherein each of the data management structures are configured to read data from and write data to one or more locations in persistent storage when accessed by the API; and a DBMS configured to: receive said query object, link said query object to one or more of the data management structures, and invoke the invokable subroutines.

According to an embodiment of the present invention, the DMBS is configured to suspend one or more of the invokable subroutines of the query object while a resulting read from persistent storage is performed, and resuming the invokable subroutines when the resulting read is completed.

According to an embodiment of the present invention, the DBMS is executed by a runtime selected from a group consisting of: the Java Virtual Machine and the .NET Common Language Runtime.

According to an embodiment of the present invention, at least one of the data management structures used in the database is selected from the group comprising: B–Trees and B+Trees.

According to an embodiment of the present invention, the DBMS invokes an invokable subroutine by: looking up a stack frame size of said invokable subroutine; pushing a new stack frame on to a stack, wherein said new stack frame has a size equal to said stack frame size of said invokable subroutine; copying a current value of a program counter to the new stack frame; copying the query object and one or more additional arguments to the new stack frame; setting a stack pointer to point to the new stack frame; and setting the program counter to point to the beginning of the invokable subroutine.

According to an embodiment of the present invention, the client serializes the query object and submits the query object to the DMBS using a network connection and wherein the DBMS receives the serialized query object and deserializes the serialized query object.

According to an embodiment of the present invention, the client and the DBMS are run on a runtime, the query object is an instance of a class, the client includes a token in the serialized query object that identifies a class of the query object, and the DBMS instantiates an object of that class and populates fields of the object using data from the serialized query object.

According to an embodiment of the present invention, the DBMS allocates a custom classloader for the client; the DBMS uses the custom classloader to deserialize the serialized query object; upon deserializing the serialized query object, the custom classloader initiates loading of a class and determines whether bytecode of the class is locally available, the custom classloader further, upon determining said class is not locally available, sends a message to the client requesting bytecode for the class; the client sends the bytecode and a token identifying the class that the bytecode corresponds to, to the DBMS; the DBMS receives the bytecode and loads it with the custom classloader and continues deserializing the serialized query object.

According to an embodiment of the present invention, the client runs with a proxy classloader, wherein the proxy classloader keeps a mapping of each class that it loads and bytecode that was used for each class, wherein when the DBMS requests bytecode for a class from the client, the client loads the class, looks the class up in the mapping of each class that it loads and bytecode that was used for each class, and sends the bytecode that was found to the DBMS.

According to an embodiment of the present invention, the DBMS maintains a cache in non-transitory memory; one or more of the data management structures are configured to, when called by one or more of the invokable subroutines of the query object, upon reading data from or writing data to a location in persistent storage, store the location and corresponding data in the cache; and prior to performing said reading data from persistent storage, the one or more data management structures first checks if the read location is in the cache, and upon determining that the location is in the cache, the one or more data management structures use the associated value in the cache without reading the location from persistent storage.

According to an embodiment of the present invention, when the query object is invoked, the DBMS allocates a transaction and links the transaction to the query object.

According to an embodiment of the present invention, the DBMS maintains a cache comprising tuples, each tuple comprising a location, a timestamp and a value; the transaction requests a data read wherein the location is not found in cache; the DBMS reads a value from the location from the persistent storage and stores a tuple in the cache comprising the location, a first timestamp, and the value; the transaction (i) is assigned a second timestamp, later than the first timestamp, when it first requests a data read, (ii) stores read requests and corresponding values and (iii) buffers write requests; and when the transaction completes, the DBMS iterates thru the writes stored in the transaction, creates a new tuple in the cache for each write comprising the location, the current time, and a value in the write; the transaction is marked as read-only and requests reads; the DBMS looks up the newest cache for that location as old or older than the transaction; the transaction is not marked as read-only and every time the transaction requests read data, all previous reads are verified to be up to date, the newest cache for that location is used, and any writes that the transaction has performed to that location are applied; and the transaction is found to be not up-to-date, the transaction is discarded and the query object is invoked again.

According to an embodiment of the present invention, the DBMS designates an area of the persistent storage as a journal and maintains a current location; the transaction stores a list of writes, each comprising a location and a value; the journal, prior to applying any writes associated with the transaction to the persistent storage, sequentially writes the list of writes at the current location; the journal terminates the sequential write with a marker indicating the sequential write has been completed and the current location is incremented by the number of bytes written.

According to an embodiment of the present invention, prior to shutting down, the DBMS first ensures that all writes have been written to their respective locations and then writes the marker to the journal indicating that the journal is empty.

According to an embodiment of the present invention, when starting up, the DBMS checks the journal and if it isn't marked as empty, the DBMS iterates thru the journal, reading each list of writes and writing each of them to correct locations, then marking the journal as empty and continuing with startup.

According to an embodiment of the present invention, when starting up, the DBMS checks the journal and if it isn't marked as empty, the DBMS iterates thru the journal, reading each list of writes and inserting an entry in the cache for each write in each list, and continuing with startup.

According to an embodiment of the present invention, suspension of execution is accomplished by: configuring a subroutine to copy a portion of a stack above a point at which the invokable subroutine is invoked and storing a reference to this stack copy and the program counter value with the query object, setting a stack pointer to a value at the point at which the invokable subroutine was called; and setting a program counter to point to a second instruction occurring after a first instruction that called the invokable subroutine.

According to an embodiment of the present invention, resuming execution is accomplished by: configuring the DBMS to copy a stack copy stored with the query object onto the stack; incrementing the stack pointer by the length of the stack copy; and setting the program counter to the value that was stored with the query object.

According to an embodiment of the present invention, a system for providing direct access to data in a database management system (DBMS) comprises: a database comprising a collection of columns, tables and indexes, each comprising one or more data management structures each comprising an application programming interface (API) and a number of locations in persistent storage; a client configured to submit a query object to the DBMS, the query object comprising data and one or more invokable subroutines, wherein the query object is configured to access one or more of the data management structures by invoking the API, wherein the API is configured to send to the DBMS one or more data requests that data be read from or written to a location in persistent storage; and a DBMS configured to: receive said query object, link said query object to one or more of the data management structures, invoke the invokable subroutines, receive the data requests, perform reads from and writes to persistent storage to satisfy the requests, and return replies to the API, wherein the API and query object are configured to suspend execution of one or more of said invokable subroutines when the API attempts to read data that is not available, and wherein the DBMS resumes execution of invokable subroutines of the query object when the data becomes available.

According to an embodiment of the present invention, a method for providing direct access to data in a database management system (DBMS) comprises the steps of: receiving a query object comprising one or more invokable subroutines and configured to access one or more data management structures of a database wherein each data management structure (DMS) comprises an application programming interface (API) configured to send one or more data requests that data be read from or written to a location and a number of locations in persistent storage, linking said query object to one or more of the data management structures, invoking the invokable subroutines, receiving the data requests from the API, performing reads from and writes to persistent storage to satisfy the said data requests, and returning replies to the API.

According to an embodiment of the present invention, an array is stored in the cache at a location; a first query object subroutine reads the array from the cache, stores a first concise representation of an array operation without modifying the array, determines that the first query object subroutine will complete successfully and applies the first concise representation to the array, modifying the array without copying it; and a second query object subroutine reads the array from the cache, stores a second concise representation of an array operation without modifying the array, determines that further processing of the array is required, makes a copy of the array and applies the second concise representation and further processing to the copy, stores the copy and upon determining that the second query object subroutine will complete successfully stores the copy in the cache at the location.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

Figure 1:
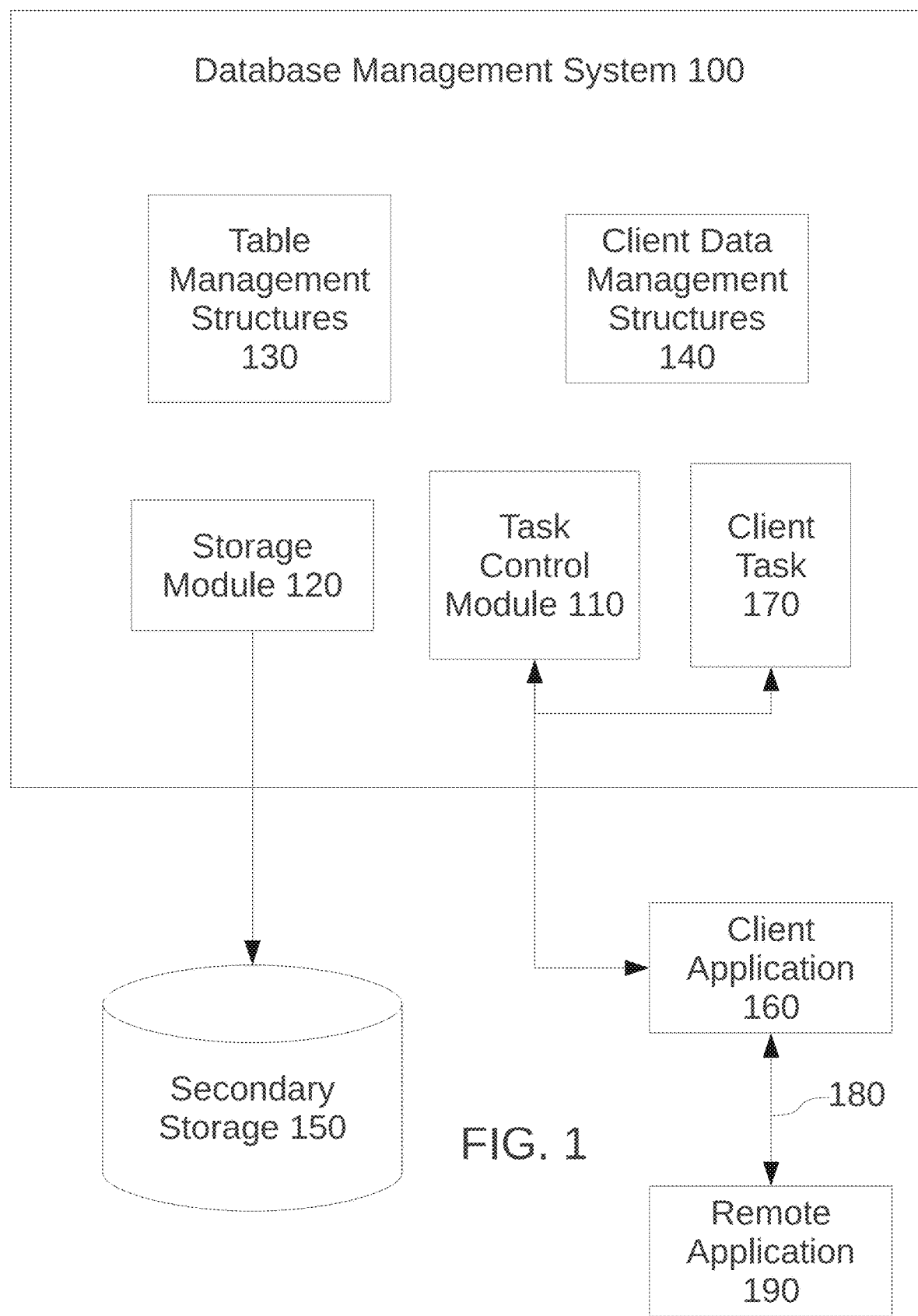
FIG. 1 illustrates a database management system for processing structure linked native queries, in accordance with an embodiment of the present invention.

The present invention relates to the field of database management systems, and in particular to a method and system for executing queries in a runtime. Embodiments of the invention provide a computer-implemented method, computer program product, and system for database management. The system exposes the underlying storage structures used to manage the data. The system also supports running a query native to a language runtime.

Embodiments of the present invention generally provide a system and methods for handling queries from an application in a database management system. Currently, these queries are handled by utilizing a degree of abstraction, isolating the application code from the underlying data management structures that the DBMS uses to interface with secondary storage, and as such limits the capability of the queries and results in inefficient use of network and secondary storage bandwidth and application developer resources. These costs are particularly high when the developer writing the queries is more familiar with the application language than the query language or the algorithm that is being implemented is complex. In contrast, embodiments of the present invention provide a way for an application developer to query the database in a manner that is similar to how in-memory data structures are accessed. Embodiments of the invention may then enable the development of richer applications by smaller teams.

In one embodiment, the system provides a structure linked native query (hereinafter SLNQ) database and a client application communicatively connected to the SLNQ database. The SLNQ reads a packet from a remote client application (e.g., over a network connection, from an application on a local device, via a request from a virtual machine), deserializes a payload from the packet into a runtime object (i.e., a query object), and adds the object query to a queue. If, in the process of deserializing the object, the system determines that the bytecode defining the object is not available, it negotiates with the client application to supply the bytecode and loads it in a dedicated classloader to isolate it from the full runtime.

According to an embodiment of the present invention, once determining that resources are expected to be available to complete the query, the system removes the query from the queue, links the query with B+Tree and array data management structures, and a task execution method (e.g., runTask( )) of the query object is called. The task execution method accesses the linked B+Trees and arrays, calling insert, remove, and/or get methods, which in turn attempt to access the underlying data in a main memory cache. When the requested data is not available in the cache, the SLNQ suspends execution of the query and schedules I/O to satisfy the request, resuming the query when the data becomes available. After several cycles of invoking DMS methods, scheduling I/O, and suspension and resumption, the query completes its processing, any changes are written to the cache, and to a journal and a location in secondary storage. Prior to committing and before resuming the query, the SLNQ verifies that the data that the query has used is up to date, and if it is not, restarts the query. After the query has successfully completed, a message is sent back to the client application. In this way, SLNQ provides an Atomicity, Consistency, Isolation, Durability (ACID) compliant DBMS, interfacing with applications using a client/server architecture, capable of executing many queries in parallel on commodity hardware, running application and query code written in the same language and using in-memory semantics for accessing resources stored in secondary storage.

According to one embodiment of the present invention, as shown in FIG. 1, a database management system 100 for processing structure linked native queries is shown. System 100 includes a Task Control Module 110, a Storage Module 120, Table Management Structures 130, and Client Data Management Structures 140. Storage module 120 communicates with Secondary Storage 150.

An embodiment of DBMS 100 may be implemented on a suitably configured computer system as described in FIGS. 4 and 5 below. Secondary storage 150 comprises storage media that has been designated for this use. Illustrative, non-limiting examples of secondary storage include any number or combination of hard disk drives, solid state drives, and network attached storage. Media devices may be exposed to the DBMS directly as raw devices, through a partition of the device, through one or more files managed by an OS filesystem or using a dedicated API. Non-volatile block devices, in which the smallest unit that can be read or written is a block and data persists when powered off, are the most common form of secondary storage. For example, a modern HDD has a block size of 4096 bytes. One of ordinary skill in the art would appreciate that there are numerous types of computing devices and configurations for those computing devices that would work with embodiments of the present invention, and embodiments of the present invention are contemplated for use with any appropriate computing device.

Client application 160 submits Client Task 170 to the DBMS 100. In one embodiment, DBMS 100 is run on the JVM using a single process and one or more threads. Client application 160 is run in the same JVM process on a dedicated thread. In such an embodiment, client task 170 is a Java object, possibly an instance of an anonymous class or a lambda expression, and the client application submits the task object by passing it to a DBMS method.

In some embodiments, client application 160 is a service that communicates with a remote application 190 over communication link 180. Communications link 180 may be implemented by any medium or mechanism that provides for the exchange of data between client application 160 and remote application 190. Examples of communications link 180 include, without limitation, a network such as a Local Area Network (LAN), Wide Area Network (WAN), Ethernet or the Internet, an inter process communication, or one or more terrestrial, satellite or wireless links. In one such embodiment, client application 160 comprises a web application running in a web server, remote application 190 comprises a web browser, and communication link 180 is the internet.

Figure 4:
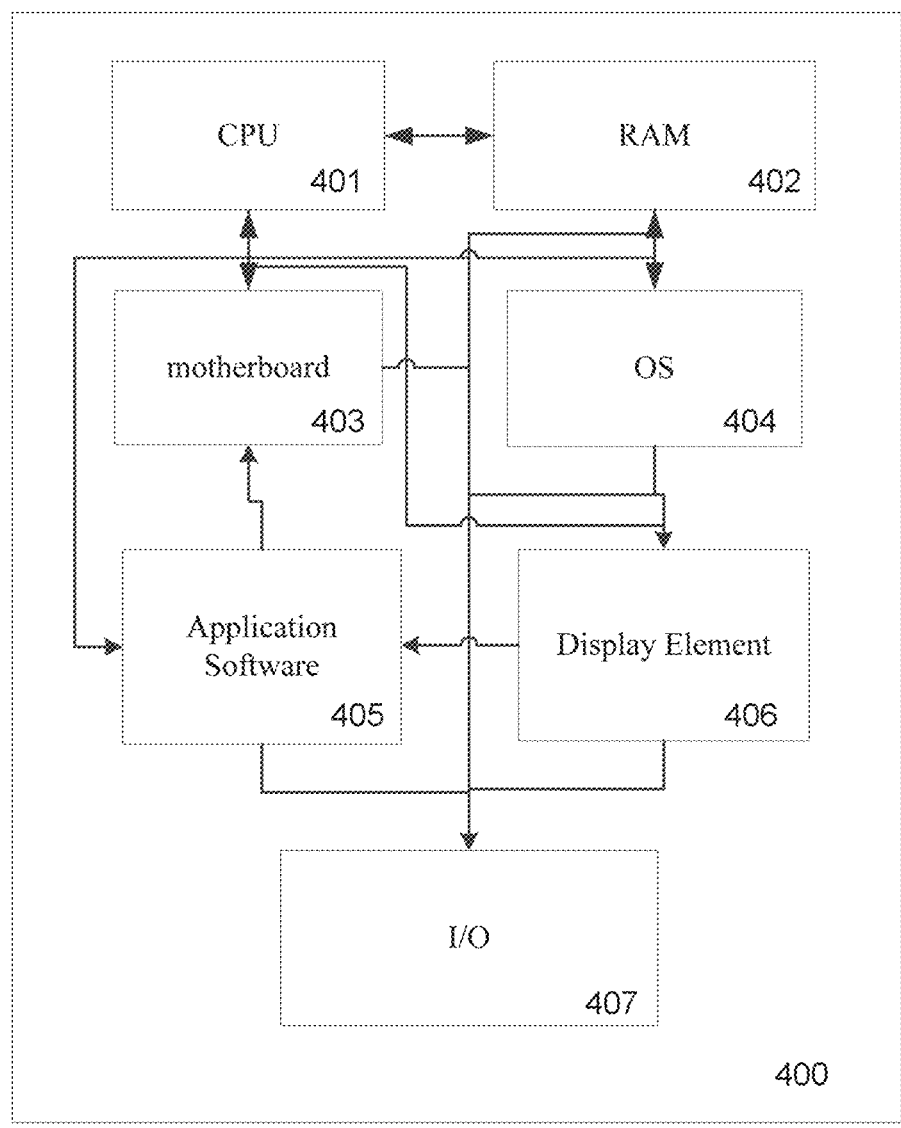
FIG. 4 illustrates a schematic overview of a computing device, in accordance with an embodiment of the present invention.

The components discussed above in FIG. 1 are implemented as one or more processes on at least one computer, such as, as depicted in FIG. 4. A language runtime environment (not shown) included in the address space of each process implements the core behavior of a computer language, connecting the compiled application with the operating system and computer hardware on which it runs. In the case of the C language, the runtime is a relatively thin layer, a set of instructions that are inserted into the executable itself. The Java Virtual Machine (JVM), the runtime for Java programs, and the Common Language Runtime (CLR), the runtime for C # and several other .NET languages, are Managed Runtime Environments (MRE) which provide a higher level abstraction of the underlying computer. The C runtime, JVM, CLR, and any similar runtime are suitable runtimes for processes implementing the current invention. In some cases, a single process can support multiple runtimes. For example, Java programs can access both the JVM and C runtimes, allowing subroutines in either language to be called. In another embodiment, both the JVM and CLR runtimes are supported.

While each of the components discussed above is depicted separately in FIG. 1, one or more of the above functional components may be implemented together. For example, task control module 110 and storage module 120 may be implemented in the same Java class or package, or run in the same thread.

While each of the components discussed above is depicted atomically in FIG. 1, one or more of the above functional components may be implemented as a collection of processes or threads, possibly running on multiple distinct computers or virtual machines. For example, storage module 120 may be implemented as one JVM process on a first computer, and a second C process running directly on a second computer. Similarly, task control module 120 may be implemented as one process running on the JVM and another process running on the CLR.

While the collection of components discussed above are depicted together in FIG. 1, one or more of the above functional components may be executed separately. For example, task control module 110 may be executed on one MRE running on a first physical computer and storage module 120 may be executed directly on another physical computer. In each of the previous examples, one of ordinary skill in the art would appreciate that there are numerous configurations that could be utilized with embodiments of the present invention, and embodiments of the present invention are contemplated for use with any appropriate configuration.

Client task 170 is comprised of data and at least one subroutine that is callable by a runtime supported by the process or processes implementing the Task Control Module 110. Calling a subroutine comprises pushing current variables and arguments to a known location (e.g., a stack, a processor register) and setting the program counter to the entry point of the subroutine. When the subroutine finishes, the process is reversed. The exact layout of the saved data is typically determined by the runtime or the compiler.

Management structures 130 and 140 are collections of structures used to organize the secondary storage. One common structure is the B+tree. Other structures are a B−Tree, hash table, array, and a serialized object. The structures provide an API that is made available to client tasks such as 170. Each type of structure exposes a different API, but in general they provide a means to find a value given a key, set a key's value, insert a key value pair, and delete a key value pair. In some structure types, such as a B+tree, the keys are potentially complex objects of variable size that must be serialized before being stored in secondary storage. In other types, such as an array, the keys are simple integers (e.g., a row index).

Each of the structures has a representation in secondary storage comprised of portions of secondary storage. In general, given the location of the beginning of the structure in storage, the data at that location represents the locations of the remaining data. For example, the branch nodes of a B+tree hold locations of additional nodes. Given the root node, all the locations in secondary storage that comprise the B+tree can be enumerated.

Figure 2:
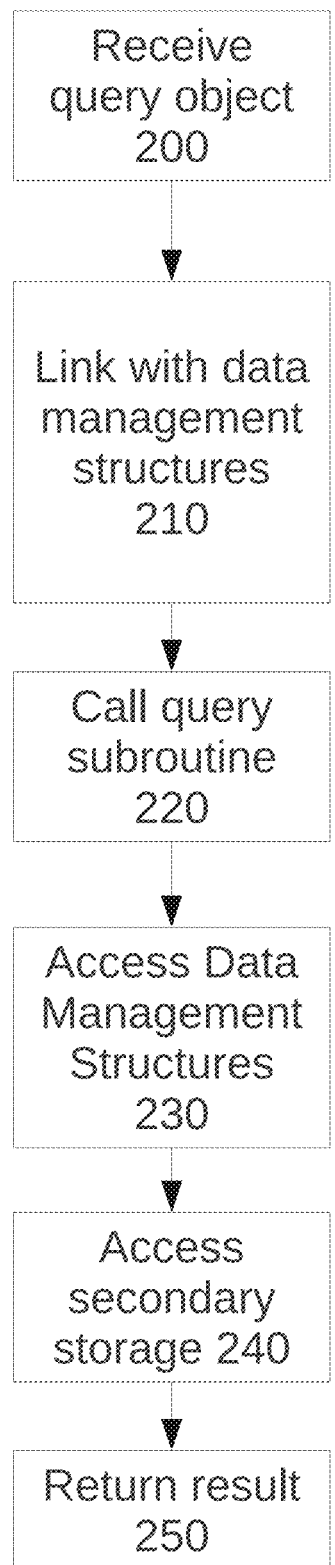
FIG. 2 is a process flow diagram showing a computer-implemented method for the operation of a system according to an embodiment of the present invention.

FIG. 2 is a process flow diagram showing a computer-implemented method for the operation of a system according to an embodiment of the present invention. By performing the steps of FIG. 2, a DBMS may execute a structure linked native query and return a result. The steps of FIG. 2 shall be described with reference to transferring client task 170 from client application 160 to DBMS 100 and are accomplished by the components depicted in FIG. 1.

Operation begins at block 200, where Task Control Module receives task 170. The DBMS may immediately begin processing the task or may defer the task, eg by adding it to a queue of pending tasks.

At block 210 the DBMS begins processing the task 170. Data management structures 130 and 140 are initialized and references are linked to the task. In one embodiment, the structures and task are java objects, and references to the structures are stored in fields in the task. In another embodiment, an API is provided to return references to the structures. In some embodiments, only the table management structures 130 are stored in fields, which in turn allow the task to retrieve the client structures 140 using an API. In one embodiment, the DBMS exposes the data management structures as both JVM objects and as C data structures, and is able to link the structures with both JVM tasks and C subroutine tasks.

In step 220, the DBMS calls the query subroutine of the task. Calling the subroutine comprises saving local variables and arguments to a known location, and setting the program counter to the beginning of the subroutine. In one embodiment, the task is a JVM object and the subroutine call happens according to the conventions defined by the JVM. In another embodiment, the subroutine is a C function and the subroutine call happens according to the convention defined by the C runtime.

In step 230, the client task 170 accesses the data management structures 130 and 140 using their API. In one embodiment, the structures 130 include a B+Tree and an array. The task passes a key to the B+tree's find method, and then passes the returned row index to the arrays get method.

In step 240, the data management structures 130 and 140 access secondary storage 150. In step 250, the task's calls to the data structure APIs return, the task completes processing and returns any needed values to the client application 160. In some embodiments, the task saves any needed values internally, the DBMS calls another task method, eg getReturnValues, and passes the returned value to the client application.

In some embodiments, during step 210 the DBMS provides a means for client task 170 to communicate with client application 160. For example, the task could send intermediate results to the client application enabling it to display a progress bar in a user interface or request additional data needed for the query.

In a DBMS, it can be advantageous to process multiple tasks concurrently. In particular, if the secondary storage is slower for random access than for semi-sequential access, such as is common with an HDD, the multiple tasks result in a higher density of pending reads, potentially allowing a higher overall I/O throughput. Embodiments of the task portion may utilize a number of approaches. The task portion may run client tasks in a plurality of threads, either starting a new thread for a task, or using an existing thread in a thread pool. The task portion may also run client tasks in one or more external processes, possibly on another machine, either starting a new process for a task or using an existing process in a process pool. The DBMS and an external task process may communicate using shared memory, a pipe, a socket, a network, or any other technology that enables inter-process communication. In such an embodiment, the DBMS may provide a means to enable the client task running in an external process to communicate with the client application that created it. One of ordinary skill in the art would appreciate that there are numerous types of communications that could be utilized with embodiments of the present invention, and embodiments of the present invention are contemplated for use with any appropriate communications type.

On many operating systems, threads and processes are resource-intensive and using a process or thread per task limits the total number of tasks that can be run concurrently. In some embodiments, a single thread may process multiple client tasks concurrently by preempting the task, for example, when the thread requests data from secondary storage that is not readily available, and resuming the task at a later time (e.g., when the requested data becomes available). Preemption may be accomplished by many means. In some embodiments, the task subroutines are written in continuation-passing style and submit callbacks along with data requests and when the requests are ready the DBMS invokes the callback, allowing the algorithm to continue. In some embodiments, the DBMS runtime supports continuations, generators, coroutines or the similar, and the DBMS utilizes this support. In some embodiments, the implementation language does not directly support preemption, but it is achieved by modifying the compiled code and/or linking to a library. For example, an implementation may include a tool for modifying compiled Java bytecode and a library for runtime support that enables methods to yield, and the stack to be saved and restarted. Similarly, in one embodiment, coroutine support may be used to preempt and restart tasks that have been written in certain languages.

In one embodiment of the present invention, storage module 120 maintains a cache of a subset of the data stored in secondary storage 150. In one embodiment, the cache stores data corresponding to entire blocks of a block device. The cache may be maintained in main memory, off-heap memory, an SSD or any other storage media. One of ordinary skill in the art would appreciate that there are many locations that the cache could be maintained, and embodiments of the present invention are contemplated for use with any appropriate cache storage location.

In some embodiments, the cache may keep multiple snapshots of portions of secondary storage 150, each with information describing the state of the DBMS at the moment of the snapshot. For example, the state information might describe which tasks or transactions had completed at that moment. Additionally, writes that are committed in between snapshots may be recorded with the cache. For example, each transaction may be assigned a monotonically increasing identification number when its values are considered committed, and the number of the last transaction applied to a snapshot may be stored as the version. In this manner, an older database value can be reconstructed.

It is desirable for a database to offer ACID properties, namely: atomicity, consistency, isolation and durability. Atomicity guarantees that all transaction tasks will be completed in their entireties. Consistency assures that only valid data is written to the database. Isolation assures that other operations cannot access or "see" data in an intermediate state during a transaction. Durability assures that once a transaction has been processed successfully, it cannot be undone. In some embodiments, the DBMS is ACID. As will be obvious to one versed in the art, embodiments of this invention may use a number of approaches to offer these guarantees, including locks on rows or columns, multiversion concurrency control (MVCC) and logging changes.

In some embodiments, transactional semantics are available to tasks, which may comprise one or more transactions. A means of identifying a transaction may be passed to any of the data structure methods, allowing the progress of the transaction to be tracked. Writes are buffered and reads recorded until the transaction indicates that all writes are ready to be committed. The DBMS then verifies that all data that was read has not changed since and commits the writes to secondary storage in a manner that maintains the ACID guarantees. If read values have changed, the transaction is rolled back and restarted. In one embodiment this is achieved by looking up the value in the MVCC cache, applying any outstanding writes and comparing the result with the value of the initial read. In some embodiments, prior to committing writes from a transaction to permanent storage, the collection of all writes for that task are written to a log. If a write fails part way thru, for example because the DBMS or server crashes, the log may be used to recover the correct values. The DBMS may provide a means of informing the task or client application that the task's writes have been successfully committed to cache or permanent storage.

When a structure requests to read a region from secondary storage, the corresponding hunk of data may be found in cache or read from disk and stored at least temporarily in cache. A simplistic approach is to copy that data and pass the copy to the data management structure routines. However, these copies may be expensive. In some embodiments, the DBMS exposes the cache memory to the data management structure algorithms and it is used directly for reads, but the algorithms copy the memory prior to performing a write, known as copy on write (COW). Further, for some operations, rather than copying on write, the routine may store a more concise description of the operation. For instance, a B+tree inserting a value at a location may need only store the key-value pair and the location. When the write is committed, after the possibility of rollback has been eliminated, the operation may be performed directly on cache memory, allowing the cost of the copy to be eliminated in this additional case, potentially a significant savings for write-heavy usage. In some situations, the DBMS may determine that the value is needed prior to commit. For example, to perform multiple operations on the save value, and preemptively perform the copy, saving it in place of the saved operation.

In one embodiment, the DBMS and client application are implemented as a single Java application executed by the JVM. The client application runs in a thread of its own and the DBMS uses a separate thread for the media portion and task portion. Table management structure 130 includes a B+tree, that has a root node stored at a predetermined location in secondary storage 150, which maps client data structure names to the location of the root node of the client data management structures 140, a collection of B+trees, each with a unique name. A Java class provides an API for manipulating each of the B+trees, including insert, remove and lookup methods. In step 210, an object is allocated and configured to represent the B+tree 130, and the reference is stored in a field in task 170. Task 170's query method is called in step 220, and it uses the stored reference to look up the location of one of the client structures, passing the structure name to the B+tree 130's lookup method. A new structure object is allocated and the root node initialized using the returned location. Task 170 then calls the client structure's insert method, passing a key-value pair. In the process of executing the insert, client structure 140 reads node data recursively from secondary storage 150, descending the tree until the correct leaf node is found. Then the key-value pair is stored in the leaf and the leaf data written to the leaf node's location in secondary storage. This example is intended to be illustrative only, as one skilled in the arts will understand, additional types of data structures could be used, calculations could be performed using values from multiple structures, values could be stored to multiple structures, resulting in reading and writing to any number of locations in secondary storage.

Cache (48)

Secondary storage is non-volatile memory that is not directly accessible by the CPU. It may comprise one or more discreet devices. Such devices include a hard disk drive (HDD), a solid state drive (SSD), a network attached storage (NAS), and a flash device. Many secondary storage devices include a volatile memory that is used as a cache. In some devices, a write may be stored in cache, and the device may report that the write has completed, but if power is lost before the data is written to the non-volatile portion, the data is lost. However, under normal operation each write is non-volatile, and some devices provide a means for handling a loss of power or provide a mechanism to indicate a write to the non-volatile portion has finished. Most secondary storage devices are block devices, ie the smallest unit that can be read or written is a block of a fixed size, aligned to that size. Eg, most modern HDDs have a block size of 4096 bytes.

Allocable storage is a portion of secondary storage designated by the DBMS, eg thru a configuration file provided by the application developer, for the storage of the data comprising the data management structures. DMS methods request the allocation of storage, and the DBMS upon receiving the request allocates a portion of Allocable storage, returning an address of the portion.

Journal storage, or journal, is a portion of secondary storage separate from allocable storage, designated by the DBMS, eg thru a configuration file provided by the application developer, for the temporary storage of data and metadata that a DMS has requested written to allocable storage, such that in the event that the DBMS stops running, eg due to a loss of power, the data may be recovered. As such, the journal may allow for a set of writes to be atomic. Journaling writes may also allow for increased throughput by converting random access writes into sequential writes.

A cache is a portion of one or more components that stores a duplicate of data that is stored at, or data that is in the process of being written to, a canonical location on another component. Typically, data can be read from and written to the cache location more quickly than from or to the canonical location, respectively. As a non-limiting example, a canonical location on a secondary storage device may be cached by one or more of the following: a volatile memory portion of that device; a faster secondary storage device, eg an SSD acting as cache for an HDD; a main memory cache managed by the OS; and a main memory cache managed by the DBMS. In a typical embodiment, there is a main memory cache managed by the DBMS and stored on the heap managed by the JVM, a main memory cache managed by the OS, and a cache managed by the HDD.

Composite storage comprises allocable storage, journal storage if present, zero or more layers of cache, data structures in main memory describing the current state of composite storage, and subroutines to manage composite storage.

In one embodiment, the DBMS runs on the JVM and the DBMS maintains a cache in off-heap storage. In some implementations of the JVM, large heap sizes result in slow performance due to garbage collection. By storing cache off-heap, this slowdown can be avoided.

In one embodiment, the DBMS runs on one physical machine, and one or more other machines, accessible over a network, provide a cache. In some embodiments, a portion of the DBMS runs on each machine and manages the cache. In other embodiments, an external cache program, eg hazelcast or ehcache, runs on the other machines and the DBMS communicates with the cache using an API provided by the external program. In one embodiment, the DBMS is run on a virtual machine that spans multiple physical machines, such as one provided by Terracota.

The details of the cache are discussed in more detail below. To one skilled in the art, it should be understood that when data is read from composite storage that the DBMS may retrieve it from one of the layers of cache, a journal, or from secondary storage, eg an HDD, and when data is written to secondary storage, it may be written to one or more of the following: a layer of cache, a journal, or a permanent storage media. In some embodiments, it is important to maintain the integrity of the data, and as such all writes must ultimately be written to permanent storage, but in other embodiments with a weaker contract, a portion of the data written to secondary storage might be written to cache and never written to permanent storage media, eg because a subsequent write to the same location took precedence.

In the preferred embodiment, the main memory layer of cache is exposed to the DMS methods thru an API. DMS and query methods may check the cache to determine if a value is available. If it is, the value may be used directly, and if not, some action other than reading the value from secondary storage may be used. Eg, if a client application needed to determine if an auto part was available in any dealership in Ohio, it could check the cache for each store's availability, and if any of them were found in cache could return true, only resorting to reading from secondary storage if no part was found in cache. In another example, a query may need to modify one of several values, and the query may check to see if any of the values are cached, and if one is, modify that value instead of the others, avoiding reading the block of an uncached value from secondary storage.

Access to Secondary Storage

In the preferred embodiment, the DBMS provides an allocations API. DMS methods invoke the API to request a number of contiguous blocks of allocable storage, ie an extent, and to free an extent. The DBMS receives the request and performs the requested operation. One skilled in the arts will understand that many different algorithms may be used to manage the available and allocated blocks. In the preferred embodiment, the DBMS maintains a heap pointer to the first unallocated block and B+Trees of extent locations and lengths that have been allocated to and subsequently freed by DMS methods. When a DMS method makes an allocation request, the DBMS first checks the freed trees and uses a freed page if one is large enough, falling back to allocating from the heap and incrementing the pointer. When a page is freed by a DMS method, the DBMS adds the first block location and length to the locations B+Tree, merging contiguous pages into a single page, and updates the lengths B+Tree accordingly. If the end of the resulting merged page equals the heap pointer, the pointer is decremented by the size of the page and the page is removed from the B+Trees. The trees and pointer are stored in composite storage as part of the TMS.

In the preferred embodiment, the DBMS also provides an API allowing DMS methods to request a portion of a page, known as a local allocation. DMS methods may store frequently accessed data in these local allocations, improving data locality. Algorithms and structures similar to those used for managing the page allocations are used for managing the local allocations. In one configuration, local allocation sizes are rounded up to a power of 2, and each power of 2 size is managed together. The DBMS maintains an array for each power of 2 size and stores the index of the owning data management structure.

In one anticipated embodiment, the DBMS maintains an address translation table and relocates the contents of pages and adjusts the translation table, allowing it to store data that is used together closer together in secondary storage, improving I/O performance, or combine several smaller freed blocks into a single larger block.

Data Management Structures

A data management structure comprises a portion of allocable storage and routines to access and manage that portion. When the DBMS links a query with a DMS, it allocates and initializes an in-memory value. In the preferred embodiment, this value is an instance of a class, the class including the routines. The table management structures store the name of the class associated with each DMS. A single DMS may be linked with multiple queries concurrently, each query object storing a reference to a unique instance of the associated class. Many data management structures may be associated with a single class. The preferred embodiment provides 3 basic structure classes: HunkCount—a simple counter; HunkArray—an array type; and Btree—a B+Tree. Each is backed by secondary storage. Each block of allocable storage can be allocated to a single DMS, can be used as a local allocation holding data from multiple data management structures, or can be unallocated. Subclasses of the HunkArray and Btree classes exist for common types such as integers, doubles and Strings, and the API allows application developers to write subclasses specialized to other object classes and primitives. Further, clients can define additional data management structure classes. An instance of a DMS class is known as a DMS object.

The contract for DMS classes is defined as

```
public static interface Hunkable<TT extends Hunkable> {
    public int create( );
    public void createCommit(long locBase);
    public String name( );
    public TT init(String $name);
}
```

The DBMS calls the create method which must return the size of the local allocation. Next, it calls createCommit with locBase being the location in secondary storage of the local allocation. The structure is constructed and the create and createCommit methods are called. The name method must return the fully qualified name of the structure which is then provided to the init method. This name is the means by which the DBMS uniquely identify DMS instances in the database and allows queries to access the correct DMS instance.

The HunkCount structure stores a single integer value in a local allocation, providing a getter and a setter.

The HunkArray structure logically represents a variable length array in which values can be accessed by index, providing getters and setters for both single elements and ranges of the array. The data is stored in composite storage. The block level table and the length of the array are stored in local allocation. Blocks are allocated in extents using the allocations API, arranged into levels comprising a fixed number of extents. All extents at a given level are a fixed number of blocks, and the fixed number doubles from one level to the next. The block level table comprises the locations of each extent in allocable storage at each level. This arrangement has the desirable properties of making it fast to convert an index to an offset in the block level table, allows for addressing a huge space with a small block level table, and keeping the maximum unused storage area to a minimum. Subclasses are provided for integers, doubles, fixed size strings and tuples comprising fixed size elements.

The Btree structure is a B+Tree, each node comprising an extent of a fixed number of blocks of allocable storage. The root node location and the depth of the tree are stored in a local allocation. Branch nodes store keys and extent locations of descendant nodes. Leaf nodes store key-value pairs. Subclasses are provided specified for common types, including integers, floating point numbers, Strings and objects. It provides API entry points for inserting a key-value pair, for finding a key, for finding a range of keys, for iterating over a range of keys, and for accessing a leaf node. The base classes may be extended by the application developer, allowing specification for additional types.

Component Lookup

In a preferred embodiment, a means must be provided to identify data management structures so that queries can be linked with the correct DMS.

In the preferred embodiment, structures are identified by a unique name provided when the structure is created. Each structure makes a local allocation of a known size. The DBMS stores a mapping of the unique name to the location of the allocation and a serialization of the structure in a catalog B+Tree, a component of the TMS. The DMS classes are designed so that only the configuration of the object is stored in the serialization—the stored data is omitted and the serialization is never updated after creation. A subsequent query looks up the unique name of a DMS that it wishes to access in the B+Tree, finding the location of the local allocation and the serialized structure, which is deserialized, yielding a DMS object which is initialized with the location. The query then uses the API to call the DMS methods. Most data management structures have methods that use allocated blocks to store the data that is inserted, but in some cases, eg HunkCount, all values are stored in the local allocation.

In the preferred embodiment, the table management structures are instances of the same classes, specifically Btree and HunkArray, and are stored and loaded in a manner similar to how the client DMS are stored. The serialization and local allocation are stored at pre-determined locations in secondary storage. In step 210, the B+Tree is created by reading the serialization and deserializing it, and the B+Tree is initialized with the location of the local allocation.

Other embodiments could use a unique integer or any unique, known, identifier to identify structures. In some embodiments, more than one catalog B+Tree could be used with the identification needing only to be unique to a given layer, eg a DBMS managing multiple databases could use a separate catalog B+Tree for each database. This embodiment would have the advantage of allowing modification of one catalog B+Tree without slowing access to others, which in some use cases could be a point of resource contention.

In some embodiments, a convention is followed by which such structures are never deleted or relocated, and the DBMS creates an in-memory instance of a DMS class, initializes that instance with a particular local allocation and unique name, and then links that single instance with more than one query object. This has the benefit of reducing the cost of linking.

Databases, Tables, Columns

In one such embodiment, the DBMS provides abstract Database and Table classes. Application developers extend these classes, adding fields of DMS class types to Table classes and of Table and DMS classes to the Database classes, and the DBMS will create and initialize the components automatically. In this embodiment, the unique name of a DMS is generated by concatenating the Database name with the field names leading to the DMS, and all data management structures are loaded at database startup. Queries specify one or more Database subclasses that they wish to access and in step 210 the DBMS provides the instances of those classes.

Queries

To access the database, application developers write, compile and submit queries to the DBMS. A query comprises data and one or more subroutines that are invokable by the DBMS. In some embodiments, the data is embedded in the subroutines. During compilation, the high level language that the query is written in is converted to bytecode or machine code, ie code that is invokable by a machine either virtual or physical, and it is this more compact representation, or a reference to the representation, that is submitted to the DBMS. The DBMS provides a means of receiving the query object. In some embodiments, the DBMS and client run in the same address space and the DBMS provides a method that accepts a query object which indirectly references the compiled subroutine. In other embodiments, the DBMS and client run in separate processes and communicate using a network, pipe or shared memory. In such an embodiment, the DBMS listens for a query object on that communication means and the compiled code is sent over the same means.

In one embodiment, the DBMS and client are run in separate threads on a common JVM. The DBMS comprises a DMS master B+Tree, the local allocation stored at a fixed known location in secondary storage, a component of the table management structures, which stores a mapping from DMS name to the location of the corresponding local allocation and a class identifier. The DBMS allocates a master object, an instance of the corresponding Java B+Tree class, and initializes it using the known local allocation location.

The DBMS defines a Java class with an abstract query( ) method and a field for storing the master object, the client defines a Java subclass, ie a static class, inner class, nested class or anonymous class, that provides a concrete implementation of query( ), during compilation of the client the implementation is compiled to bytecode, ie the query subroutine, and at runtime the client allocates an instance of that subclass, ie a Java object, and submits it to the DBMS by passing it to a DBMS method.

A typical query invokes master object methods to retrieve references to client DMS instances corresponding to table and column names and then invokes methods on those instances to store data in and retrieve data from allocable storage. When the master object retrieval method is invoked with a name argument, the method looks up that name in the mapping, resulting in the corresponding local allocation location and class identifier. The method then allocates a new instance of the class that is identified, initializes it with the location, and returns the instance to the query subroutine.

One particular query subclass is worth discussing in more detail. This query subclass defines a functional interface and a field to store a reference to an implementation of that interface, and the query( ) method invokes the implementation. The DBMS or client provides a method that accepts an implementation, allocates a query object instance of the query subclass, assigns the implementation to the field and submits the instance to the DBMS. The client defines an implementation of the interface, eg a lambda expression, and passes it to the method. In this manner, the client is able to succinctly define a query using a lambda expression.

In another embodiment, the DBMS and client are C assemblies run in the same process with a shared address space in distinct threads, queries comprise a function pointer and a data pointer, and the DBMS invokes the query by calling the function pointer, passing the data pointer, according to the conventions of the C ABI for the host platform.

I/O Commands

An I/O command is a message representing a read from or write to allocable storage, comprising one or more locations in allocable storage and an operation. In some embodiments, an I/O command is an instance of a class that extends a base class and the operation is an abstract method defined by the base class. In other embodiments, the operations can be predefined by the DBMS and selected by a token in the message. Some operations require a hunk of data, eg a read operation may store the result in a byte array or as a primitive value. The hunk of data may be a portion of the message or external to the message, eg a reference to a byte array on the heap. In some embodiments, the I/O command accesses secondary storage directly. In other embodiments, the DBMS accesses secondary storage and makes a portion available to I/O commands.

In the preferred embodiment, reads and writes are instances of a Command subclass and are limited to a single location in secondary storage. The DBMS calculates the block of secondary storage and the offset into that block corresponding to the location.

For reads, the DBMS reads the block of composite storage into a buffer, the read command subclass provides an implementation of a read(buffer,offset) method, and the DBMS calls this method, passing the buffer and offset. When the DBMS accesses composite storage it may retrieve the block from a layer of cache, from a journal or from the allocable storage portion of secondary storage. Subclasses are provided for reading primitive types such as integers and doubles, which are stored as a field, and byte arrays, which are allocated on the heap and stored by reference. In one such embodiment, a reference to the buffer is stored as a field in the command instance (and subsequently accessed by the query, allowing a query to access an entire block of secondary storage with zero memory-to-memory copies).

For writes, the DBMS reads the block of allocable storage into a buffer from composite storage, the write command subclass provides an implementation of a write(buffer,offset) method, the DBMS calls this method, passing the buffer and offset, the method modifies the buffer, and the DBMS writes the buffer to composite storage. In one such embodiment, the DBMS detects that the result of the write doesn't depend on the prior state of the page and skips reading it from composite storage, ie if the write comprises the entire block.

I/O Request

An I/O request is an attempt by a query method to access allocable storage, either by directly accessing secondary storage or by submitting an I/O command to the DBMS.

The performance, especially random access performance, of a persistent storage portion of secondary storage can be orders of magnitude slower than main memory. Some cache layer portions of secondary storage can be significantly slower than main memory. And some cache layer portions of composite storage may have performance comparable to main memory, eg a cache layer portion implemented in main memory. As a result, the latency of a query subroutine can vary greatly depending on whether and where the data the query accesses is cached.

Query Thread

To execute the query, the DBMS may use an existing thread that also processes non-query DBMS methods, an existing thread dedicated to processing query methods, possibly from a thread pool, or create a new thread. The thread that a query method is run by is known as the query thread.

A "thread" is the entity within a process that the kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

Periodically, a thread may stop executing while, for example, a slow I/O device completes a data transfer or while another thread is using a resource it needs. Because it would be inefficient to have the processor remain idle while the thread is waiting, a multi-tasking operating system will switch the processor's execution from one thread to another in order to take advantage of processor cycles that otherwise would be wasted. This procedure is referred to as "context switching." When the I/O device completes its data transfer or when a resource needed by the thread becomes available, the operating system will eventually perform another context switch back to the original thread. Because of the speed of the processor, both of the threads appear to the user to execute at the same time.

It will be appreciated that context switching, while generally a very useful and beneficial procedure, can also reduce the performance level of the computer system if it is performed at a high rate. Every context switch consumes valuable processing time and resources, thereby reducing the amount of other useful work that the processing unit can accomplish. Those skilled in the art will appreciate that context switches are expensive and can reduce the capacity of the system.

Many OSes and runtimes provide a mechanism by which a thread is able to place itself in a waiting state, ie to suspend itself, and another thread is able to send a signal to wake it up, ie to resume the suspended thread, eg Java provides Object.wait( ) and Object.notify( ). When a thread is placed in the waiting state, the OS or runtime no longer schedules that thread until the thread has been resumed.

Reading from Secondary Storage

As one skilled in the arts will recognize, a query method may invoke DBMS, component, client, runtime, or 3rd party library methods, which in turn may invoke other methods, resulting in arbitrarily deep call stacks. For the purpose of this document, any method called below the query method in the call stack is considered to be part of the query method. Ie, if a query method calls a B+Tree method which accesses secondary storage, the query method would be said to have accessed secondary storage.

In some embodiments, a query accesses secondary storage directly in a blocking fashion, eg by using the fread( ) function on the linux platform to read a portion of secondary storage. In such an embodiment, the OS may suspend the calling thread if the requested data is not available, placing the query thread in a waiting state until the I/O completes, at which point the thread is placed in a runnable state and eventually scheduled, the blocking call returns and the query method continues.

In some embodiments, a query accesses secondary storage directly in a non-blocking or asynchronous fashion, eg by using the aio_read( ) function in C or Java's AsynchronousFileChannel, and the non-blocking call may return before the requested operation is complete. Upon completion, the OS or runtime signals the query, eg on Windows using a I/O Completion Port (IOCP), on Linux using sigevent, or on Java using java.util.concurrent.Future.

In one embodiment, the DBMS runs on the CLR, initializes an IOCP object with a callback, and links the object to a query; the query calls ReadFile, specifying a portion of allocable storage and the IOCP object, and calls Monitor.Wait, suspending the query thread. The CLR completes the read operation and signals the IOCP object and calling the callback, which calls Monitor.Pulse, causing the query thread to resume.

In some embodiments, instead of directly accessing allocable storage, a query creates an I/O command message, submits that message to the DBMS, and waits for the DBMS to indicate that the specified operation is complete. The DBMS receives the message, performs the requested read from or write to secondary storage, and notifies the client query that the operation is complete, at which point the query continues. In some such embodiments, the DBMS uses one or more dedicated threads, distinct from the threads running queries, to process I/O commands. In some such embodiments, a query submits an I/O command message and then continues processing other information while the DBMS is processing the command. When all processing is blocked, the query suspends the query thread, and the DBMS upon completion of the I/O command resumes the query thread, eg in Java by calling Object.notify( ).

A coroutine is a subroutine which in addition to the conventional means of return supports cooperative suspension by invoking a yield, which causes execution to continue from another point, and is able to resume execution at the point after the yield, preserving it's internal state in the meantime. In a true coroutine, the coroutine is able to control where execution continues by naming another coroutine in the yield call. In a generator, also known as a semi-coroutine, the generator is only able to return control to the generator's caller. For the purpose of this document, we define a coroutine to include any mechanism by which a subroutine can cooperatively yield control of execution, rolling back the stack to the point at which the coroutine was initially called, preserving state, and be resumed at the point after the yield with the state restored. This includes true coroutines, continuations and generators.

In some embodiments, the query subroutine is a coroutine. The DBMS invokes a first query subroutine which makes an asynchronous I/O request, either calling a non-blocking I/O routine using the DBMS as a listener for the I/O completion signal or by submitting an I/O command message to the DBMS. The first query subroutine then yields according to the coroutine convention and flow control returns to the DBMS at a point after query subroutine invocation, and the DBMS continues processing additional query objects. After completion of the I/O command or reception of the I/O completion signal, the DBMS resumes the first query subroutine at the point of the yield call. A single query subroutine may yield multiple times. In this manner, the DBMS can process a large number of queries concurrently.

Coroutine semantics can be implemented using stack modification. In stack modification, the query on yielding records the stack pointer, the program counter and the portion of the stack between the initial invocation of the query subroutine and the yield, saving it in main memory, and sets the stack pointer and program counter to the point after the initial invocation. The DBMS on resuming the query restores the stack, copying the recorded copy of the stack on to the stack, and sets the stack pointer to the saved value and the program counter to the point after the yield. A means is needed to store the metadata associated with the yield, eg the location of the initial call and the register and stack records. Typically, this is done by passing a fiber argument to each coroutine, and the metadata is stored in the fiber. Stack modification has the advantage that application developers can write queries without knowledge of the suspension in the typical imperative style, and the modification can be achieved by a library, by a compiler or by bytecode manipulation.

In some runtime environments, eg Java, the runtime does not allow direct access to the stack. In one embodiment, the query records enough of the modifications to the stack at each point in the call chain that the stack can be recreated, and upon yielding the query saves that record of modifications. Upon resuming, the query rebuilds the stack at each point in the call chain by replaying the recorded modification. The query is written in a high level language without provisions for recording and replaying modifications to the stack, and a compiler or bytecode weaver is used that results in bytecode that implements the recording and replaying of the modifications to the stack. In one such embodiment, the kilim bytecode weaver is used. In another such embodiment, the Quasar weaver is used. In such an embodiment, each subroutine in the query subroutine call chain that may yield, either directly or indirectly, must be so modified.

It will be appreciated that the yield may be issued by a DBMS, component, client, runtime or 3rd party library method portion of the query, ie deep in the query call chain. The entire stack in between the invocation of the query subroutine and the point of the yield must be recorded.

Invoking a Subroutine

A thread has an associated context comprising a program counter, a stack pointer, a number of other register values, and a stack, located in the address space of the thread's process in main memory. When the thread is scheduled, these register values are copied from the context to the registers of a CPU and the CPU begins executing the code located at the address of the program counter. When the thread is suspended, eg because it's allocated timeslice expired, it called a blocking I/O method or it explicitly requested suspension, the current register values are copied to the thread context. The location and organization of the context is dependent on the OS and library or conventions implementing threading on the platform.

In most runtimes, the stack is one large contiguous hunk of memory, but in some, multiple blocks are used linked together by pointers.

While a thread is running, it may modify the program counter, causing the CPU to evaluate the next instruction from the new location.

A subroutine is a sequence of program instructions that conforms to an application binary interface (ABI). The ABI defines the sizes, layouts and alignment of data types; how subroutine arguments are passed, ie some combination of on a stack and in registers; how return values are passed; how the stack winds and unwinds; and the relationship between the stack pointer and the location of local and argument variables on the stack. For the purpose of this document, an invokable subroutine is a subroutine that conforms to an ABI that the DBMS supports.

To invoke a subroutine, the calling program unit sets up the CPU registers and current thread's stack according to the ABI and sets the program pointer to the address of the first instruction of the subroutine. When the subroutine returns, it places any return values in the locations defined by the ABI, restores the stack and sets the program counter to the return address. Many platforms support instructions for performing a portion of this work automatically. Eg, the x86 call instruction pushes the address of the next instruction onto the stack and jumps to a subroutine, and the ret instruction pops that address from the stack and jumps to it.

On many platforms, a subroutine may return to a different location than the location specified by the calling unit. Eg, a C subroutine may manually manipulate the stack and perform a longjump instead of returning to the calling unit.

Invoking a C Function, x86-64

In one embodiment, the DBMS is a C application running on a Linux OS on an x86-64 architecture. The DBMS provides a helper object that provides an API by which queries can access DBMS functionality. The query object comprises a function pointer to a C subroutine, ie to the query method, the address in the address space of the DBMS, and a pointer to a data portion. The subroutine takes 2 pointer arguments, the data portion pointer and a pointer to the DBMS helper object. The DBMS invokes the query subroutine according to the convention of the System V AMD64 ABI. The calling unit is also a subroutine, and the calling unit prologue stores the size of the calling unit stack frame size. The stack pointer in incremented by this size. At the point of invocation, the DBMS saves any caller-saved registers that are in use, stores the data pointer portion of the query object in register rdi, the helper pointer in register rsi, and using the call instruction pushes the next instruction location onto the stack as the return address and sets the program counter to the value of the function pointer portion of the query object.

The CPU fetches it's next instruction from the start of the query subroutine. Upon completion, the query subroutine stores a return value in register rax, restores any callee-saved registers that have been modified, and using the ret instruction sets the program counter to the return address popped from the stack. The CPU fetches it's next instruction from the location after the subroutine call, restoring the caller saved registers with the previously saved values.

Invoking the PE Query

In the preferred embodiment, the DBMS is a java application running on the Hotspot JVM on an x86-64 Linux, comprising a helper object that provides an API by which queries can access DBMS functionality and a query runner method. The query object is a Java object that extends an abstract Task class, comprising an implementation of an abstract query( ) method, ie the query subroutine, and a reference to the helper object.

The DMS methods yield after issuing I/O commands according to the coroutine convention. Prior to loading DMS classes and query classes, the classes are modified by the kilim bytecode weaver which adds a Fiber argument and stack replay bytecode to implement coroutine semantics to each method that may be in a call chain that yields. For a discussion of the bytecode modifications see http://www.malhar.net/sriram/kilim/thread_of_ones_own.pdf, section 2.1.

Initially, the JVM runs the query runner and query subroutine in interpreted mode, but after multiple invocations, the Hotspot JVM just-in-time compiles them, resulting in x86-64 machine code. The query runner allocates a Fiber object, stores a reference to the helper object in the query object field, and invokes the query subroutine according to the convention of the Java Hotspot compiler, passing the Fiber object as an argument.

Specifically, the query runner increments the stack pointer by the size of the query runner stack frame, stores the query object reference in register rsi, stores the Fiber object reference in register rdx, pushes the next instruction location onto the stack as the return address, and sets the program counter to the location of the query subroutine. The CPU then fetches and executes the query subroutine instructions, which configure the CPU to access fields and methods of the query and helper objects, and upon completion read from the stack and set the program counter to the return address.

It should be recognized that the application developer writes imperative, object oriented code using standard Java language constructs. The Java compiler transforms the Java code to bytecode, the kilim weaver modifies the bytecode, and the Hotspot JIT then generates machine code, which is ultimately executed by the JVM. The resulting machine code is executed according to the Hotspot ABI, and implements coroutine semantics.

Networked Client

In some embodiments, the client is a remote application which communicates with the DBMS via a network connection. The client and DBMS may communicate using any appropriately configured networking technology including TCP, UDP, shared memory, and raw sockets over any appropriately configured transport, including ethernet, memory and loopback devices.

In such an embodiment, the client initializes a remote query object, serializes it to an array of bytes, inserts the array into one or more packets and sends them to the DBMS. The DBMS provides a listener for the network connection, receives the packets, extracts the byte array and deserializes it into a query object, and processes the object. In most cases it is desirable for the client to receive feedback. The DBMS may automatically send replies to the client, eg the serialization of the query subroutine return value; the DBMS may provide means to facilitate the query communicating with the client, eg linking the query with the connection to the client; or the query may comprise information to connect to the client directly. The query subroutine bytecode must be made available to the DBMS and identified in the query object. The bytecode may already exist in the client and be referenced using a schema or the bytecode may be sent to the DBMS and loaded, perhaps in the same packet as the query object or as a component of the query object.

In one embodiment, the DBMS and client are C applications, the client comprises a dynamically linked library (DLL), comprising a query subroutine, the starting location of the subroutine identified by a symbolic name. The client creates a query data and serializes it, producing a serialized query, ie an array of bytes. The client opens a TCP socket to the DBMS and sends a message comprising the serialized query, the symbolic name, and the DLL with tokens according to a protocol to identify the portions of the message, over the socket. The DBMS receives the message and uses the tokens and protocol to extract the symbolic name, the DLL, and the serialized query, which is deserialized producing a query data. The DBMS saves the DLL to a file in ramdisk, loads that file using dlopen( ) and looks up the symbolic name using dlsym( ), producing the address of the query subroutine. The DBMS then invokes the query subroutine, passing it a pointer to the deserialized query data.

In such an embodiment, the serialization and deserialization can be accomplished using any appropriate technology, as one skilled in the arts will recognize. Eg, Google's protobuf, Troy Hanson's tpl available from github.com, or custom C code may be used. In one such embodiment, the DBMS doesn't deserialize the serialized query, passing a pointer to that byte array directly to the query subroutine, which deserializes it. In this manner, the query data and serialization technology are opaque to the DBMS.

In some such embodiments, the client creates a 2nd query data, serializes it, and sends it with the subroutine symbol name to the DBMS. The DBMS receives the message, deserializes the serialized query, looks up the symbol name, eg using a cache or calling dlsym( ) again, producing the first query subroutine address, and invokes it again, passing a pointer to the 2nd deserialized query data.

In the preferred embodiment, the DBMS and client are Java applications. The client runs with a proxy classloader supplied as part of the DBMS. For each class that the client attempts to load, the proxy calls the parent classloader's getResourceAsStream( ) method and reads the stream into a byte array. It saves a mapping from the class name to the byte array, and loads the byte array as the class using defineClass( ).

The client opens a network socket to connect to the DBMS and provides a token to identify the session. The DBMS sets up a session for the client, including a custom classloader and associates it with the socket.

The DBMS defines a Query class with an abstract query( ) method and the client defines a SubQuery subclass that provides a concrete implementation of query( ). The client creates an instance of SubQuery, triggering the proxy classloader to load the class and record the mapping from the class name to the bytecode byte array. The client then serializes the instance, giving a serialized query byte array, the serialization including a token identifying the fully qualified class name, and sends that byte array to the DBMS using the socket.

The DBMS receives the serialized query byte array and initiates deserialization using the custom classloader associated with the session, triggering the classloader to attempt to load the SubQuery class name. The classloader checks to see if the bytecode defining the class is available locally and upon determining that it is not, sends a request to the client using the socket requesting bytecode for the class name, the client looks up the class name in the proxy classloader mapping, and sends a reply to the DBMS custom classloader comprising the associated bytecode byte array and a token identifying the class name. The custom classloader loads the byte array using defineClass( ), which may trigger the loading of additional classes, in which case they are handled in the same manner, ie by sending a request to the client if the appropriate bytecode is not available locally and using the reply to define the class.

The DBMS custom classloader completes loading the SubQuery class, the instantiation of the deserialized query object completes, and the DBMS invokes the query( ) method.

The client sends additional serialized instances of the SubQuery class to the DBMS over the socket identified with the session ID, and the DBMS deserializes them using the extant custom classloader identified by the session ID, the JVM recognizing that the class has already been loaded, without additional requests for bytecode being sent to the client. After a requisite number of invocations, the JVM will JIT the query subroutine bytecode, resulting in machine code.

Java Serialization

The serialization and deserialization of Java objects can be accomplished using any appropriate technology. The default Java serialization may be used. In some embodiments, there may be an advantage to using an alternative serializer such as kryo available from EsotericSoftware on github.com. In such an embodiment, the flow of information may differ somewhat. Eg, kryo assigns an integer ID to each class and maintains a mapping from ID to class name, and the DBMS and client must communicate this mapping to enable loading the correct bytecode over the network connection, but has the advantage that the class name can be identified prior to deserialization, allowing the bytecode to be requested outside of the classloader which improves non-blocking performance. Other alternative serializers may require similar modifications to the data flow. Such modifications should be doable by one skilled in the arts.

In the preferred embodiment, the client maintains a list of classes sent to the DBMS for a given session and prior to sending a serialized query message calculates the bytecode that the DBMS is likely to request and preemptively sends it in the same message, and the DBMS is configured to receive the bytecode and make it available to later attempts to load a class.

In one embodiment, multiple network connections are used between the client and the DBMS for a given session to enable the client to continue to submit queries and the DBMS to continue to run those queries while a prior query is blocked, waiting on bytecode required to load a class.
PE Caching In the preferred embodiment, the DBMS composite storage comprises a portion of secondary storage and a main memory cache. The secondary storage portion is a large contiguous file on a HDD managed by the ext4 filesytem. When the file is created, zeros are written to it in order to ensure that it is contiguous and monotonic. The block size of both the HDD and the filesystem is 4096 bytes, and the file size is a multiple of the block size. The cache comprises a number of cache pages, each cache page comprising a byte array with a size equal to the block size, and a number of fields for managing the page, a block index, a modification timestamp and an access timestamp.
Transactions and Generations The DBMS defines a transaction comprising a creation timestamp, a completion timestamp and an I/O record; and a generation comprising a starting timestamp, a list of dirty pages, and a list of transactions.

The DBMS maintains a clock and a current generation. The data management structure methods are configured to link with a transaction, eg HunkArray.get(Transaction txn, int index), and add read requests and write requests to the I/O record, each request limited to a single block, ie the DMS methods don't access secondary storage directly. Some DMS methods yield themselves, others return a promise and another method in the call chain, eg the query subroutine itself, yields and retrieves the value thru the promise.

In the process of invoking a query subroutine, the DBMS increments the clock, allocates a transaction using the clock value as the creation timestamp, and passes the transaction to the subroutine as an argument. The query subroutine marks the transaction as read-only or read-write, links DMS methods with the transaction and invokes them, which in turn add I/O requests to the transaction, and the query, and the query subroutine yields.

When flow control returns, the DBMS calculates a request timestamp, either the timestamp of the current generation for read-only transactions or the current clock value for read-write transactions. The DBMS traverses the I/O record and for each read request that has not yet been satisfied calculates a block index.

The DBMS checks the query cache for a cache page matching the index, choosing the newest page as old as the request timestamp, producing a cached page. If the index is not found in the cache, the DBMS reads the corresponding block from the persistent portion of secondary storage into a byte array and adds the index and byte array to the cache as the cached page with a modification timestamp of zero. The DBMS evaluates the read request against the cached page and marks the read request as satisfied.

To evaluate a read request, the DBMS starts with the cached page byte array, and using COW semantics, the DBMS applies any write requests in the transaction I/O record prior to the read request, and then applies the read request.

For read-write transactions the DBMS checks the transaction for consistency. To check transaction consistency the DBMS checks all read requests in the transaction against the cache and verifies that the most recently modified page in the cache for the corresponding block cache would result in the same value as the original read value. If any values have changed, the transaction and fiber are discarded and the DBMS restarts the query processing.

After all reads have been satisfied, the DBMS resumes the query subroutine. The query subroutine performs calculations using the satisfied read requests. The query subroutine marks the transaction as committed and yields and the DBMS commits the transaction.

To commit the transaction, the DBMS increments the clock, checks the transaction for consistency, and traverses the I/O record and for each write request calculates the block index, acquires a cached page using the block index, applies the write request to the cached page, sets the modification timestamp to the current clock value, and records that page in a list of dirty pages.

To acquire the cached page, the DBMS looks up the block index in the cache tree, and traverses the tree from that node to find the most recently modified page matching the block index. If a matching page is not found, the DBMS allocates a new page for that index, adds it to the cache, and uses it as the cached page. If the most recently modified page was last modified prior to the current generation's starting timestamp, the DBMS copies it to a new page, inserts the copy into the cache after the most recently modified page, and uses the copy as the cached page. Otherwise, the DBMS uses the most recently modified page directly as the cached page.

When a cached page is retrieved from the cache for either a read request or a write request, the access timestamp is set to the transaction creation timestamp if it is more recent.
State Machine The DBMS maintains a state machine that controls the committing of generations and scheduling of queries.

Once all previous generations have been written to journal, ie the second marker page has been written, and there is at least one dirty page in the current generation or the journal is full, the DBMS initializes a new generation with the current clock as a starting timestamp, storing a reference as the current generation, and commits the now previous generation.

To determine if the journal is full, the DBMS conservatively estimates the free space remaining in the journal and compares it with a threshold, and if smaller deems the journal full. If during the attempt to commit a transaction the DBMS determines that there is not enough space in the journal to write all the dirty blocks, the query is rolled back. To roll back the query, the commit is aborted, the transaction is discarded and the query subroutine is re-scheduled to be invoked.

If a DropOutstanding exception is thrown, the DBMS defers processing new queries and rolls back all current in-process queries, ie queries that have been invoked a first time but haven't completed. If the journal is nearly full or the current generation dirty pages list exceeds a threshold size or the sum of the update list and covered list sizes is too large, the DBMS defers processing new queries. When a generation completes, processing is restarted.
Cache Invalidation In addition to the cache list, the DBMS maintains 3 lists of cached pages; an update list, a current list and a covered list. Each block index in the cache is referenced in one of these lists, and cache pages for the same block index are linked together in a linked list. Initially, pages read from persistent storage are placed in the update list. When a write request is applied to a cache page for the first time, that page is moved to the covered list.

When a transaction completes, a generation is committed, or a generation is written, the cached page lists are scrubbed. First, the oldest generation is calculated as the older of the current generation creation timestamp and the creation timestamp of the oldest generation associated with a read-only transaction that has not completed. The DBMS iterates the update list and any page for which the most recent access timestamp is older than the oldest generation is moved to the current list. The DBMS then iterates the covered list and for all cached pages that are older than the current generation, moves them to the update list if as new as the oldest generation, otherwise to the current list.

The DBMS maintains a maximum size of the cache and when inserting a new page into the cache would exceed this size, the DBMS first attempts to drop a cache page from the cache. If the current list is empty, the DBMS throws a DropOutstanding exception. Otherwise, a page is selected from the current list and is dropped, ie removed from the cache and current list. In one configuration, the selection is random, and in another configuration the selections is the first element in the list, ie the cache page with the oldest access timestamp.

Don't Copy on Write

Some DMS classes, such as the B+Tree implementation, request reads of entire blocks, and then make a write request to the same location, eg to insert an element at a location. Instead of copying the byte array returned by the read request and writing the copy to cache in a write request, some methods employ "don't copy on write" (DCOW) write requests.

Such a method adds a DCOW write request to the transaction that includes an operation on a cache page byte array. This operation may be much more concise than copying the full array. If a read request for the same block index is added to the transaction subsequently, the DBMS copies the byte array, applies the DCOW write request to the array copy, replaces the DCOW write request stored in the transaction with a write request that replaces the cache page byte array with the array copy, and returns the array copy in the read request. Otherwise, when the DBMS encounters the DCOW write request during the commit of the transaction it applies the operation directly to the cache page byte array, ie without ever copying the cache page byte array.

Using a naive defensive copy would require that all accesses to blocks in secondary storage make a copy of the byte array, an expensive operation. Using COW semantics, that copy can be avoided for pages that are not modified but for write-heavy access patterns can still be expensive. Using DCOW semantics, this copy can be avoided entirely for many simple operations, including initializing a page, inserting a key-value pair into a B+Tree page, and removing a key-value pair from a B+Tree page. For write-heavy access patterns in which most transactions don't modify the same page of a B+Tree more than once, avoiding the COW can represent a dramatic speedup and in the worst case, the cost of DCOW is minor.

To further illustrate the DCOW request, consider inserting a key-value pair into a B+Tree leaf node storing 4-byte integer keys and values. The B+Tree method calculates the index into the node, and adds a DCOW request comprising the index and the key-value pair, ie 12 bytes of data. When the request is applied, it shifts the B+Tree data at the index by the size of the key-value pair and writes the pair and increments the number of elements. In contrast, without DCOW, this operation would require copying the entire page, typically 4096 or 8192 bytes.

Journal

The DBMS designates a whole number of blocks portion of secondary storage as a journal and maintains a journal location, ie a whole number of blocks offset within that portion, and defines 3 distinct marker pages.

To commit an I/O generation, the DBMS traverses the list of dirty pages, adding each associated block index to a block index list. The DBMS writes the block index list, distinguishable from the first marker page, to the journal and the first marker page to two blocks of the journal offset by the number of dirty pages, traverses the list of dirty pages, writing each page to the journal, writes the second marker to the journal, and marks all pages in the list as not-dirty. Each non-offset write to the journal incrementing the journal location by one block, resulting in a contiguous region of the journal, and the second marker page overwriting the first, the inclusive portion of the journal between the written block list and the first marker page comprising a journal stanza.

Upon writing the second marker page, the DBMS traverses the list of dirty pages, writing each page to the persistent portion at the associated block index and marking the page as not-dirty. The DBMS then writes a third marker page to the end of the stanza, overwriting the second marker page.

The DBMS compares the space remaining in the journal portion and if it is smaller than a threshold, stops processing queries, waits till all outstanding writes to allocable storage have finished, writes the first marker page to the start of the journal, resets the journal location to the start of the journal, and begins processing queries again.

When the database is shutdown, the DBMS stops accepting query objects, waits till any pending list of dirty pages is written to allocable storage, and writes the first marker page to the first block of the journal.

On startup, the DBMS reads from the beginning of the journal. For each stanza, the DBMS reads the first block of the stanza. If it is equal to the first marker page, the DBMS continues startup, ie the journal has no more valid entries in it that have not yet been written to allocable storage.

Otherwise, the DBMS calculates the length of the stanza using the first block, reads the last block of the stanza, compares the last block with the third marker page, and if they're not equal reads the block list from the stanza, traverses the block list writing each block in the stanza to the persistent portion at the block index. The DBMS then writes the third marker page to the end of the stanza.

The DBMS then proceeds to the next stanza, which begins at the next block after the end of the previous stanza.

In this way, once a block has been marked as non-dirty, it is ensured to be written to persistent storage and all blocks in a dirty list are effectively written at the same time, ie when the third marker page is written for that block. This behavior is a key for providing the ACID contract.

An HDD Portion of Persistent Storage

HDDs have much higher sequential performance than random access performance, on the order of 50000 blocks per second sequential vs 100 blocks per second random. Given a collection of blocks to read or write, performance can be increased by sorting the blocks, and by increasing the block density.

Generally, the Linux OS maintains a cache of blocks read from and written to an HDD in main memory. As the DBMS maintains the same information in the main memory cache, and needs to store additional metadata, many of the values in the OS cache are redundant and the memory that would be used can be better utilized as part of the DBMS cache.

The DBMS traverses the lists of dirty pages in block index order. Prior to reading a block, it calls posix_fadvise with an argument of POSIX_FADV_WILLNEED for the block. This access pattern allows the Linux OS to schedule reads and writes efficiently, increasing HDD performance significantly. After reading from or writing to a block, the DBMS issues calls posix_fadvise with an argument of POSIX_FADV_DONTNEED, allowing the OS to drop that block from the OS cache.

Journal writes are sequential, so they achieve near optimal throughput. Reads are sorted, but of low density, so they are relatively expensive. However, under many access patterns, reads are reduced by the main memory cache, resulting in good effective throughput. Under many access patterns, committing writes to the non journal portion of persistent storage can be a significant expense. To reduce this cost, the DBMS defers writes to the non journal portion.

The DBMS maintains a list of all the outstanding writes, ie writes that have been written to the journal but not to their non journal location in persistent storage. To commit an outstanding write the DBMS writes the outstanding write to it's non journal location in persistent storage. Each generation, the DBMS commits a portion of those outstanding writes. When the journal size exceeds a threshold, the DBMS commits all remaining outstanding writes. The journal can not be reset until this completes. This technique has the advantage of increasing write density, and duplicate writes, ie several writes to the same block index across multiple generations, can be compressed into only a single write to that block index. Under many access patterns, this technique can greatly improve effective write throughput without compromising write durability.

In one anticipated embodiment, the DBMS divides the journal into portions and cycles thru the portions, ie the DBMS starts with the first portion and when it fills up, the DBMS switches to the second portion. In this way, only the outstanding writes in the next portion must be committed before the portion can be used. When a large number of outstanding writes are committed, the DBMS throughput on handling read requests drops, similar to a garbage collection pause. By reducing the number of commits at any one time, the DBMS maximum commit pause can be reduced, at the expense of reduced throughput.

An SSD Portion of Persistent Storage

In some embodiments, an SSD is used as a cache. SSDs provide improved random access relative to HDDs, but have large block sizes, large erase block sizes, and suffer from write endurance. To take advantage of this, some embodiments may only cache less frequently modified data to SSD, keeping frequently modified data in main memory cache, and a small main memory list of the data available in the SSD cache, mapping locations in secondary storage to locations in the SSD cache. One problem associated with cache is that performance while the cache is hot may be acceptable, but on restart performance may drop dramatically until the cache is repopulated. To overcome this limitation, one embodiment stores metadata associated with the SSD component of the cache and the journal to allow the SSD portion to be used even after a crash. Writes are written to the journal, and before the journal is recycled a list of invalidated SSD cache entries, ie entries stored in SSD cache that have been written to, is written to the SSD cache metadata (also on the SSD). On restart, the SSD cache is scanned and the SSD cache mapping is rebuilt, and any locations with pending writes in the journal or listed in the invalidated list of the SSD cache metadata are invalidated in the cache to secondary storage mapping. In some embodiments, the cache to secondary storage mapping may be stored in the SSD cache as a snapshot with incremental changes saved and restored as described above. In this way, the mapping can be reconstructed with only scanning a small portion of the SSD cache, ie the journal, the snapshot location, and the incremental invalidation metadata.

In one embodiment, secondary storage includes an SSD cache comprising a main memory portion and an SSD portion. The DBMS maintains in main memory a block index array, a mapping from block index to an offset in the SSD cache, a list of inserts, a list of invalidations, a data offset and a metadata offset. When the DBMS allocates blocks to DMS allocation requests, they are allocated as usual from the allocable storage portion of secondary storage.

The SSD portion is divided into a data portion and a metadata portion, each comprising a whole number of erase blocks portion of one or more SSDs. The metadata portion is initialized by erasing each of the erase blocks.

Prior to dropping a cached page from the main memory cache, the DBMS determines whether or not to add it to the SSD cache. If the corresponding block index is not already in the SSD cache, the block index was not part of a sequential read, and the cached page has been accessed more recently than it has been modified, it is added to the SSD cache.

To add a cached page to the SSD cache, the byte array is written to the block in the data portion specified by the data offset, the block index and data offset value are stored as a key-value pair in the mapping and in the list of inserts, the block index is stored in the block index array at the offset, and the data offset is incremented. If the data offset exceeds a threshold, it is reset to zero.

If the offset corresponds to the beginning of a multiple of an erase block, the DBMS iterates over the range of offsets corresponding to that multiple, recycling the offset. To recycle an offset, the block index is read from the block index array at the offset, that element set to zero, the key-value pair corresponding to the block index is removed from the mapping, and the block index is added to the invalidation list. The DBMS commits the cache metadata and erases the corresponding erase blocks.

Prior to writing a block to allocable storage, the DBMS looks up the block index in the mapping, and if it is found removes the corresponding pair from the mapping and the block index array, and adds the pair to the invalidation list.

When the DBMS receives a read request from a query subroutine to read a block index, it first checks the main memory cache for that block index. If it's not found, the DBMS then looks up the block index in the SSD cache mapping. If a matching record is found, the DBMS calculates a location using the record offset and reads from that location in the SSD, storing the result in the cached page byte array. If no matching record is found, the DBMS proceeds to read the block from allocable storage.

In one such embodiment, if a record is found in the SSD cache, the DBMS sets an access timestamp in the record. During the erase cycle, for each block the DBMS checks the access timestamp and if it is newer than a threshold, the DBMS buffers the block in main memory and then adds the block immediately after the erase. If the number of blocks in an erase block exceeds a threshold, the DBMS skips erasing that erase block, advancing the offset to the start of the next erase block.

Prior to resetting the journal, the DBMS commits the cache metadata. To commit the cache metadata, the DBMS writes the insert and invalidation lists to the metadata portion at the metadata offset and increments that offset. When the offset exceeds a threshold, the offset is reset to zero, the metadata portion is erased, and the entire mapping is written to the metadata portion. Each commit of data to the metadata portion includes a length value at the beginning and a unique marker value at the end.

When the DBMS is restarted, the DBMS reads the metadata portion. For each page, the length of the corresponding commit is calculated, the unique marker value is verified and the data is added to the block index array and mapping. While iterating thru the journal, any block indexes that have been written to that are in the SSD cache are invalidated.

In one embodiment, a portion of an HDD and a portion of an SSD are used as allocable storage. The DBMS exposes a binding method in its API allowing a newly created DMS to be labeled as bound to the SSD portion. A query subroutine creates a new instance of a DMS and invokes the binding method. When the instance requests an allocation of secondary storage, the DBMS detects that the instance has been bound to the SSD portion and allocates a block from this portion. Otherwise, the DBMS chooses a block from the HDD portion. In another such embodiment, the binding method may be invoked after a DMS instance has been committed, and the DBMS copies all the blocks referenced by the DMS instance from the HDD portion to the SSD portion, adjusts the stored locations of the blocks and labels the DMS as bound to the SSD portion.

Figure 3:
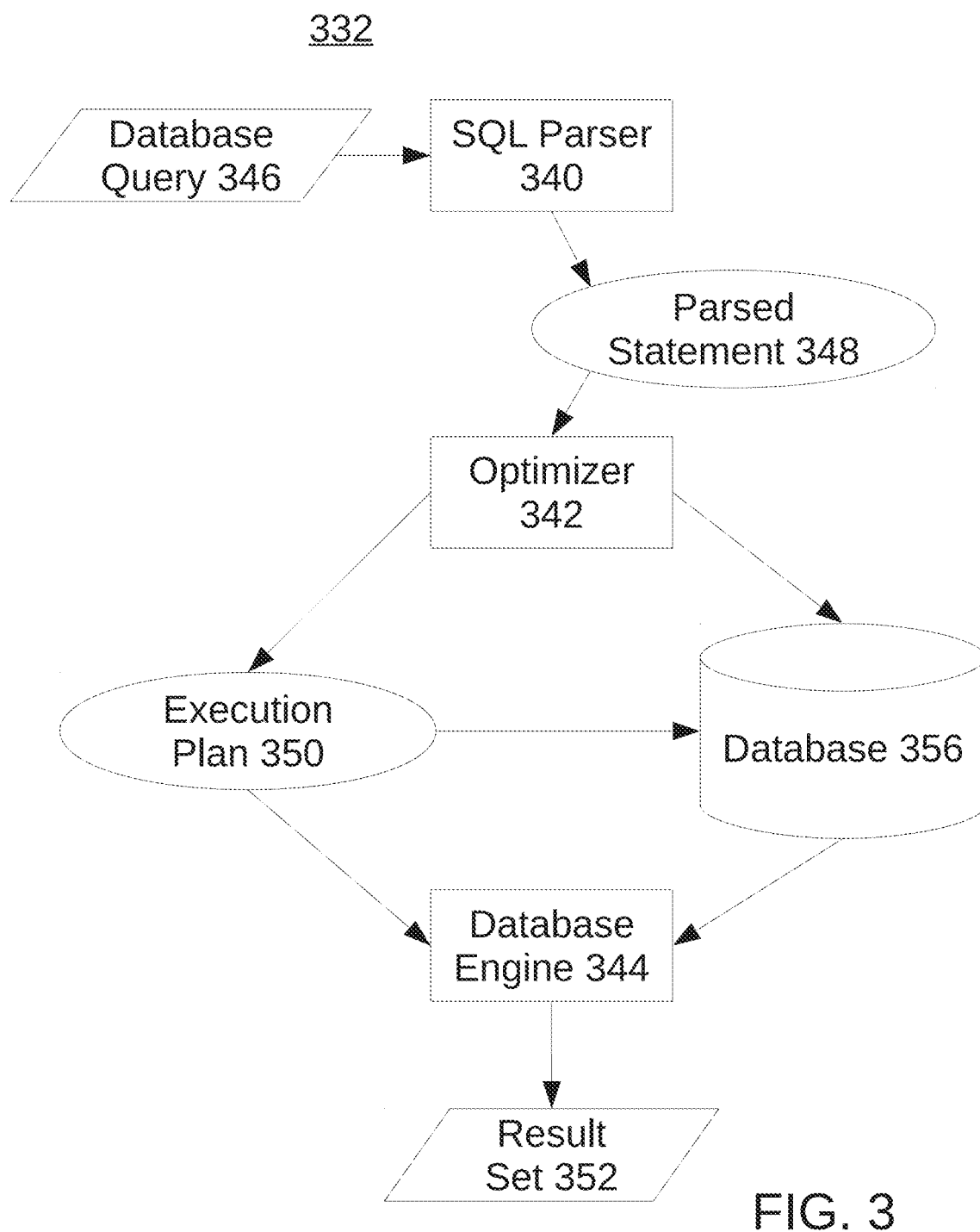
FIG. 3 is a block diagram illustrating a prior art DBMS processing a declarative query.

FIG. 3 illustrates a prior art database management system 332. The database management system includes a SQL parser 340, cost-based optimizer 342 and database engine 344. SQL parser 340 receives from a user a database query 346 which is provided in the form of an SQL statement. SQL parser 340 then generates a parsed statement 348 therefrom, which is passed to optimizer 342 for query optimization. As a result of query optimization, an execution or access plan 350 is generated, often using data such as platform capabilities, query content information, etc., that is stored in database 356. Once generated, the execution plan is forwarded to database engine 344 for execution of the database query on the information in database 356. The result of the execution of the database query is stored in a result set, as represented at block 352.

For example, SQL parser 340 receiving the following query
    SELECT*
    FROM Feature F, Chainside CS
    WHERE F.feat=CS.feat AND F.fips_s=CS.fips_s
      AND F.fips_c=CS.fips_c
      AND CS.TLID IN (SELECT C.TLID FROM Chain C, Point P
        WHERE (C.tzids=P.tzid
          OR C.tzide=P.tzid)
      AND P.tzid=11233807)
might results in an execution plan with the following textual representation
    0 SELECT STATEMENT Optimizer=CHOOSE
    1 0 NESTED LOOPS
    2 1 NESTED LOOPS
    3 2 NESTED LOOPS
    4 3 INDEX (UNIQUE SCAN) OF 'POINT_PRIMARY' (UNIQUE)
    5 3 TABLE ACCESS (FULL) OF 'CHAIN'
    6 2 TABLE ACCESS (BY INDEX ROWID) OF 'CHAINSIDE'
    7 6 INDEX (RANGE SCAN) OF 'CHAINSIDE_PRIMARY' (UNIQUE)
    8 1 TABLE ACCESS (BY INDEX ROWID) OF 'FEATURE'
    9 8 INDEX (UNIQUE SCAN) OF 'FEATURE_PRIMARY' (UNIQUE)

The actual execution plan is a tree of binary object nodes, each node corresponding to a line in the textual representation. Upon receiving the execution plan, the database engine 344 walks each node of the tree, reading an entry in the point index and the entire chain table, calculating a list of common IDs, reads each of those IDs from the chainside index and each corresponding entry in the chainside table, generating a list of chainsides, reads the ID of each valid chainside from the feature index and each corresponding entry in the feature table, generates a list of valid feature-chainside pairs, and returns that list.

Specifically, one skilled in the arts will recognize that the execution plan is not machine code and doesn't have access to the underlying data management structures, ie the indexes and tables, and the control flow is defined by the DBMS, not the query or execution plan. An equivalent query could be defined utilizing the current invention:

```
public static class CityQuery extends Database.Query {
   TreeMap res = new TreeMap( );
   Cities db;
   int tzid;
   public void query( ) {
      ObjectBtree.Data<Chain> context = db.chains.context( );
      Btree.Range all = db.chains.getall(context);
      while (all.next( )) {
         Chain c = context.val;
         if (c.tzids == tzid | c.tzide == tzid) {
            int ks = db.csmap.get(c.tlid);
            ChainSide cs = db.chainsides.get(ks);
            int kf = db.featmap.get(cs.feat);
            Feature feat = db.features.get( kf );
            if ( feat.fips_s == cs.fips_s & feat.fips_c == cs.fips_c )
               res.put(feat,cs);
         }
      }
   }
}
where the schema is defined by a class:
public class Cities extends Database {
   public ObjectBtree<Chain> chains;
   public ObjectBtree<ChainSide> chainsides;
   public ObjectBtree<Feature> features;
   public Btree.II csmap, featmap;
}
```

Each of the fields in Cities corresponds to a data management structure stored in secondary storage, ie they have been created and added to the DBMS in a previous query. The table management structures store a unique name identifying the structure, the associated class name and local allocation of each DMS. ObjectBtree is a DMS class that implements a B+Tree mapping from an integer to an object which is serialized and stored in secondary storage. Btree.II is a DMS class that implements a B+Tree mapping from an integer to an integer. Each field in Cities corresponds to a unique name identifying the DMS, the name comprising the concatenation of Cities fully qualified class name and the field name.

A client allocates an instance of the CityQuery class and submits the instance to the DBMS which receives it in step 200. In step 210, the DBMS allocates a transaction and an instance of Cities and populates the fields, linking each field with the DMS registered with the same identifying name, ie looking up the local allocation and class associated with that name, allocating an object of that class, initializing the object with the local allocation location and a link to the transaction. The query calls the DMS methods defined by the associated class, which in turn submit I/O requests to the DBMS. Eg, the call to the db.chains.getall method reads the local allocation for the chains data management structure, which includes the root node location, which is used as the current location. The method then descends the tree, ie reads a block at the current location in secondary storage, initializes a B+Tree node backed by the read block, and stores the node, the current location and an offset of zero in the context object. For branch pages, the method reads the element at the offset, sets the current location to the value of that element and continues to descent the tree.

Each call to the all.next method except the first advances the context object by one location, first by reading the associated page and incrementing the offset at the leaf level. When an offset equals the number of elements in the associated node, the method moves up a level in the context object, increments the offset at that level, and descends the tree using the element value at that offset. As such, the while loop above visits each block comprising the chains B+Tree. Each time the query reads a block from secondary storage, the query checks the main memory cache and if the block is not found, submits an I/O request to the DBMS and yields. The DBMS processes the I/O request and resumes the query.

In the preferred embodiment, this query could be expressed more compactly and efficiently, eg. by utilizing lambda expressions and streams. This naive implementation is shown to highlight the imperative, object oriented nature of the query. Initially the query method would be executed by the virtual machine and eventually compiled to machine code and invoked. In both cases, the query subroutine accesses the data management structures directly and defines the control flow.

Stored Procedures and UDFs

Prior art databases provide the ability to invoke native code in queries. Stored procedures and user defined functions are subroutines that are defined in a DBMS. When referenced by a SQL query, the storage engine calls the subroutine during execution plan evaluation. Some DBMS support such subroutines written in JVM and CLR languages such as Java and C#. Eg, DB2 and Oracle support Java subroutines, and Microsoft SQL Server supports the .NET languages. While the internals of these programs have not been disclosed, it is likely that in some situations the DBMS invokes such subroutines directly.

However, such subroutines are not linked with the data management structures. Instead, they are provided access to the data stored in the DMS either as arguments selected by the calling SQL statement or by calling a SQL select themselves.

According to an embodiment of the present invention, the system and method is accomplished through the use of one or more computing devices. As shown in FIG. 4, One of ordinary skill in the art would appreciate that a computing device 400 appropriate for use with embodiments of the present application may generally be comprised of one or more of a Central processing Unit (CPU) 401, Random Access Memory (RAM) 402, a storage medium (e.g., hard disk drive, solid state drive, flash memory, NAS) 403, an operating system (OS) 404, one or more application software 405, display element 406 (optional) and one or more input/output devices/means 407. Examples of computing devices usable with embodiments of the present invention include, but are not limited to, personal computers, smart phones, laptops, mobile computing devices and tablet PCs and servers. One of ordinary skill in the art would understand that any number of computing devices could be used, and embodiments of the present invention are contemplated for use with any computing device.

In an exemplary embodiment according to the present invention, data may be provided to the system, stored by the system and provided by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present invention are contemplated for use with any configuration.

In general, the system and methods provided herein may be consumed by a user of a computing device whether connected to a network or not. According to an embodiment of the present invention, some of the applications of the present invention may not be accessible when not connected to a network, however a user may be able to compose data offline that will be consumed by the system when the user is later connected to a network.

Figure 5:
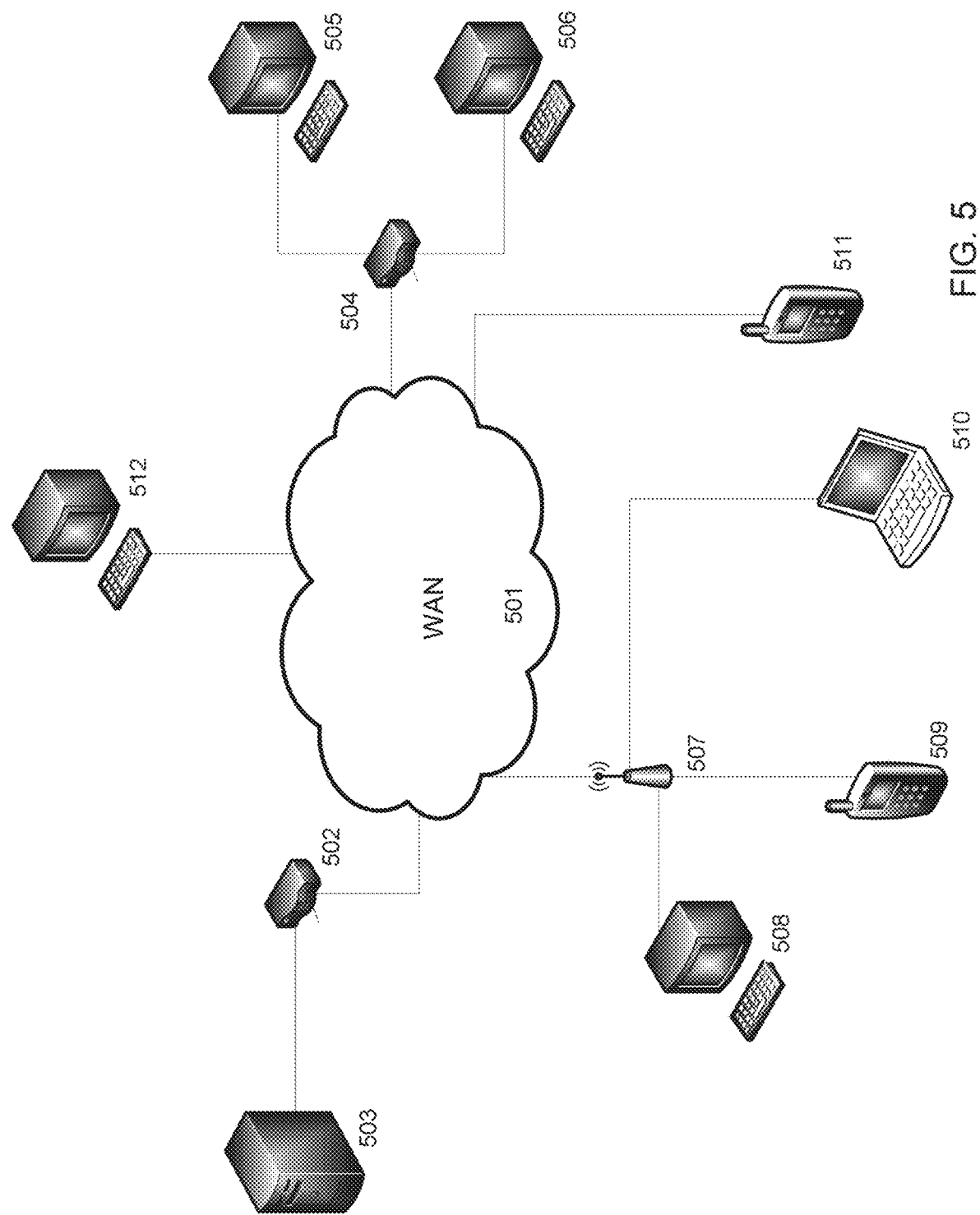
FIG. 5 illustrates a network schematic of a system, in accordance with an embodiment of the present invention.

Referring to FIG. 5, a schematic overview of a system in accordance with an embodiment of the present invention is shown. The system is comprised of one or more application servers 503 for electronically storing information used by the system. Applications in the application server 503 may retrieve and manipulate information in storage devices and exchange information through a WAN 501 (e.g., the Internet). Applications in server 503 may also be used to manipulate information stored remotely and process and analyze data stored remotely across a WAN 501 (e.g., the Internet).

According to an exemplary embodiment, as shown in FIG. 5, exchange of information through the WAN 501 or other network may occur through one or more high speed connections. In some cases, high speed connections may be over-the-air (OTA), passed through networked systems, directly connected to one or more WANs 501 or directed through one or more routers 502. Router(s) 502 are completely optional and other embodiments in accordance with the present invention may or may not utilize one or more routers 502. One of ordinary skill in the art would appreciate that there are numerous ways server 503 may connect to WAN 501 for the exchange of information, and embodiments of the present invention are contemplated for use with any method for connecting to networks for the purpose of exchanging information. Further, while this application refers to high speed connections, embodiments of the present invention may be utilized with connections of any speed.

Components of the system may connect to server 503 via WAN 501 or other network in numerous ways. For instance, a component may connect to the system i) through a computing device 512 directly connected to the WAN 501, ii) through a computing device 505, 506 connected to the WAN 501 through a routing device 504, iii) through a computing device 508, 509, 510 connected to a wireless access point 507 or iv) through a computing device 511 via a wireless connection (e.g., CDMA, GMS, 3G, 4G) to the WAN 501. One of ordinary skill in the art would appreciate that there are numerous ways that a component may connect to server 503 via WAN 501 or other network, and embodiments of the present invention are contemplated for use with any method for connecting to server 503 via WAN 501 or other network. Furthermore, server 503 could be comprised of a personal computing device, such as a smartphone, acting as a host for other computing devices to connect to.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of at least one general purpose computer, special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C#, C++, and Java. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A system for providing direct access to data in a database management system (DBMS), the system comprising:
  a database comprising a logical collection of elements organized as columns, tables and indexes, each realized as one or more data management structures comprising an application programming interface (API) and a number of locations in persistent storage, each location corresponding to an element in the logical collection;
  a plurality of query objects each comprising data and an invokable subroutine, one or more clients residing in computer memory and each executed by one or more client threads, configured to submit said query objects to the DBMS, wherein the invokable subroutine of each query object is configured to access one or more of the logical values using the data management structures API, wherein each of the data management structures are configured to read data from and write data to one or more locations in persistent storage when accessed by the API; and
  a DBMS residing in computer memory, executed by one or more DBMS threads, and configured to:
  receive said query objects,
  link each of said query objects to one or more of the data management structures, and
  invoke the invokable subroutine of each of said query objects;
  wherein the system includes means to ensure the atomicity of the invokable subroutine of each of said query objects with respect to the database;
  wherein the system includes means to ensure the isolation of the invokable subroutine of a first of said query objects from the invokable subroutine of a second of said query objects with respect to the database;
  wherein the invokable subroutines of said query objects run concurrently;
  wherein the invokable subroutine of each of said query objects is invoked by storing the subroutine in memory beginning at an address and the DBMS sets the program counter of a processing unit to that address; and
  wherein for each of said query objects, the client thread that submits said query object is distinct from the DBMS thread that receives said query object.

2. The system of claim 1, wherein the DBMS is executed by a runtime selected from a group consisting of: the Java Virtual Machine and the .NET Common Language Runtime.

3. The system of claim 1, wherein at least one of the data management structures used in the database is selected from the group comprising: B-Trees and B+Trees.

4. The system of claim 1, wherein the DBMS invokes the invokable subroutine of each of said query objects by:
  storing the invokable subroutine in memory beginning at an address;
  looking up a stack frame size of said invokable subroutine;
  pushing a new stack frame on to the stack of one of the one or more DBMS threads, wherein said new stack frame has a size equal to said stack frame size of said invokable subroutine;
  copying a current value of a program counter to the new stack frame;
  copying the query object and one or more additional arguments to the new stack frame;
  setting a stack pointer to point to the new stack frame; and
  setting the program counter to point to the address.

5. The system of claim 1, wherein the client serializes one of the query objects and submits the serialized query object to the DBMS using a network connection and wherein the DBMS receives the serialized query object and deserializes the serialized query object.

6. The system of claim 5, wherein the client and the DBMS are run on a runtime, the query object is an instance of a class, the client includes a token in the serialized query object that identifies a class of the query object, and the DBMS instantiates an object of that class and populates fields of the object using data from the serialized query object.

7. The system of claim 6, wherein:
the DBMS allocates a custom classloader for one of the one or more clients;
the DBMS upon receiving a serialized query object from said client uses the custom classloader to deserialize the serialized query object;
upon deserializing the serialized query object, the custom classloader initiates loading of a class and determines whether bytecode of said class is locally available,
the custom classloader further, upon determining said bytecode is not locally available, sends a message to said client requesting bytecode for said class;
said client sends the bytecode and a token identifying the class that the bytecode corresponds to, to the DBMS;
the DBMS receives the bytecode and loads it with the custom classloader and continues deserializing the serialized query object.

8. The system of claim 7, wherein the client runs with a proxy classloader, wherein the proxy classloader keeps a mapping of each class that it loads and bytecode that was used for each class, wherein when the DBMS requests bytecode for a class from the client, the client loads the class, looks the class up in the mapping of each class that it loads and bytecode that was used for each class, and sends the associated bytecode that was found to the DBMS.

9. The system of claim 7, wherein:
the invoking subroutine and the invokable subroutine share a calling convention;
the current thread executing the invoking subroutine is one of the DBMS threads;
the program counter and stack pointer of the current processing unit point to an instruction in the invoking subroutine and the stack of the current thread;
wherein the DBMS invokes the invokable subroutine of each of said query objects by:
storing the invokable subroutine in memory beginning at an address;
looking up a stack frame size of said invokable subroutine;
pushing a new stack frame on to the stack of the current thread, wherein said new stack frame has a size equal to said stack frame size of said invokable subroutine;
storing the current value of the program counter of the current processing unit to either the new stack frame or a register, according to the shared calling convention;
storing the query object to either the new stack frame or a register, according to the shared calling convention;
setting the stack pointer of the current processing unit to point to the new stack frame; and
setting the program counter of the current processing unit to point to the address;
wherein the invokable subroutine:
accesses the stored program counter value and the query object in either the new stack frame or a register, according to the calling convention;
upon completion sets the program counter of the current processing unit to the stored program counter value.

10. The system of claim 1, wherein:
the DBMS maintains a cache in non-transitory memory;
one or more of the data management structures are configured to, when called by the invokable subroutine of a query object, upon reading data from or writing data to a location in persistent storage, store the location and corresponding data in the cache; and
prior to performing said reading data from persistent storage, the one or more data management structures first checks if the read location is in the cache, and upon determining that the location is in the cache, the one or more data management structures use the associated value in the cache without reading the location from persistent storage.

11. The system of claim 10, wherein:
the DBMS designates an area of the persistent storage as a journal and maintains a current location;
the transaction stores a list of writes, each comprising a location and a value;
the journal, prior to applying any writes associated with the transaction to the persistent storage, sequentially writes the list of writes at the current location;
the journal terminates the sequential write with a marker indicating the sequential write has been completed and the current location is incremented by the number of bytes written.

12. The system of claim 11, wherein prior to shutting down, the DBMS first ensures that all writes have been written to their respective locations and then writes the marker to the journal indicating that the journal is empty.

13. The system of claim 11, wherein when starting up, the DBMS checks the journal and if it isn't marked as empty, the DBMS iterates thru the journal, reading each list of writes and writing each of them to correct locations, then marking the journal as empty and continuing with startup.

14. The system of claim 11, wherein when starting up, the DBMS checks the journal and if it isn't marked as empty, the DBMS iterates thru the journal, reading each list of writes and inserting an entry in the cache for each write in each list, and continuing with startup.

15. The system of claim 11, wherein:
an array is stored in the cache at a location;
a first query object subroutine reads the array from the cache, stores a first concise representation of an array operation without modifying the array, determines that the first query object subroutine will complete successfully and applies the first concise representation to the array, modifying the array without copying it; and
a second query object subroutine reads the array from the cache, stores a second concise representation of an array operation without modifying the array, determines that further processing of the array is required, makes a copy of the array and applies the second concise representation and further processing to the copy, stores the copy and upon determining that the second query object subroutine will complete successfully stores the copy in the cache at the location.

16. The system of claim 1, wherein prior to invoking the subroutine of one of the plurality of query objects, the DBMS allocates a transaction and links the transaction to the query object.

17. The system of claim 16, wherein:
the DBMS maintains a cache comprising tuples, each tuple comprising a location, a timestamp and a value;
the transaction requests a data read wherein the location is not found in cache;
the DBMS reads a value from the location from the persistent storage and stores a tuple in the cache comprising the location, a first timestamp, and the value;
the transaction (i) is assigned a second timestamp, later than the first timestamp, when it first requests a data read, (ii) stores read requests and corresponding values and (iii) buffers write requests; and when the transaction completes, the DBMS iterates thru the writes stored in the transaction, creates a new tuple in the cache for each write comprising the location, the current time, and a value in the write;

the transaction is marked as read-only and requests reads; the DBMS looks up the newest cache for that location as old or older than the transaction;

The transaction is not marked as read-only and every time the transaction requests read data, all previous reads are verified to be up to date, the newest cache for that location is used, and any writes that the transaction has performed to that location are applied; and the transaction is found to be not up-to-date, the transaction is discarded and the query object is invoked again.

18. The system of claim 1, wherein the DBMS is configured to suspend the invokable subroutine of each of the query objects while a resulting read from persistent storage is performed, and resuming the invokable subroutines when the resulting read is completed, wherein suspension of execution is accomplished by:
   configuring a subroutine to copy a portion of a stack above a point at which the invokable subroutine is invoked and storing a reference to this stack copy and the program counter value with the query object,
   setting a stack pointer to a value at the point at which the invokable subroutine was called; and
   setting a program counter to point to a second instruction occurring after a first instruction that called the invokable subroutine; and
wherein resuming execution is accomplished by:
   configuring the DBMS to copy said stack copy stored with the query object onto the stack;
   incrementing the stack pointer by the length of said stack copy; and
   setting the program counter to the value that was stored with the query object.

19. The system of claim 1, wherein the database comprises:
   a config region of Persistent Storage, and
   at least a first and a second persistent data management structure (PDMS);
wherein each PDMS comprises:
   a first and a second PDMS region of Persistent Storage;
wherein both the first and second Persistent Storage regions of both PDMS are mutually disjoint;
wherein the DBMS comprises:
   a link to a location in the database config region,
   means to calculate the first PDMS region of Persistent Storage for each PDMS utilizing only values in the database config region and the first PDMS region,
   means to calculate the second PDMS region of Persistent Storage for each PDMS utilizing only the values in the database config region and the PDMS regions of Persistent Storage of that PDMS,
   and includes means to create an in-memory DMS (MDMS) corresponding to each PDMS using values read from Persistent Storage only in the database config region and the PDMS regions of the corresponding PDMS;
wherein each MDMS comprises:
   a search-means to calculate a sub-region of the corresponding PDMS regions from a key, the sub-region intersecting the second PDMS region, wherein the calculated second PDMS region portion of the sub-region depends on at least one value read from the first PDMS region, by reading Persistent Storage values from only the database config region and the first and second PDMS regions of the corresponding PDMS;
   an invokable store-subroutine accepting a key and a value, wherein the subroutine calculates a sub-region using the search-means and said key, and writes the value to said sub-region; and
   an invokable load-subroutine accepting a key, wherein the subroutine calculates a sub-region using the search-means and said key, reads a value at said location, the value previously written to the sub-region by the store-subroutine called with a key equivalent to said key, and provides said value to the invoker
wherein:
   the DMBS receives at least a first and a second query object, creates a first and a second MDMS corresponding to the first and second PDMS, links each query objects with both MDMS;
   the DBMS concurrently invokes both query object subroutines;
   the first query object subroutine invokes the first MDMS load-subroutine, accepts the loaded value and invokes the second MDMS store-subroutine, providing a key and a value, wherein at least either the key or the value is dependent on the loaded value;
   the second query object subroutine invokes the second MDMS load-subroutine, accepts the loaded value and invokes the first MDMS store-subroutine, providing a key and a value, wherein at least either the key or the value is dependent on the loaded value.

20. A method for providing direct access to data in a database management system (DBMS), the method comprising:
   managing, by a DBMS residing in computer memory and executed by one or more threads operating on one or more computer processing units, a database comprising a logical collection of elements organized as columns, tables and indexes, each realized as one or more data management structures comprising an application programming interface (API) and a number of locations in persistent storage, each location corresponding to an element in the logical collection;
   receiving, from a source not executing on the one or more threads, a plurality of query objects each comprising data and an invokable subroutine, wherein each invokable subroutine is configured to access one or more of the logical values using the data management structures API, wherein each of the data management structures is configured to read data from and write data to one or more locations in persistent storage when accessed by the API;
   linking said query objects to one or more of the data management structures;
   invoking the invokable subroutine of each of said query objects by storing said subroutine in memory beginning at an address and setting the program counter of one of said processing units to said address, wherein the invokable subroutines of said query objects run concurrently;
   ensuring the atomicity of the invokable subroutine of each of said query objects; and
   ensuring the isolation of the invokable subroutine of a first of said query objects from the invokable subroutine of a second of said query objects with respect to the database.

* * * * *